US011831801B2

(12) United States Patent
Tang et al.

(10) Patent No.: US 11,831,801 B2
(45) Date of Patent: Nov. 28, 2023

(54) COMMUNICATION DEVICE WITH A PURPOSE-DRIVEN GRAPHICAL USER INTERFACE, GRAPHICS DRIVER, AND PERSISTENT DISPLAY

(71) Applicant: THE LIGHT PHONE INC., Brooklyn, NY (US)

(72) Inventors: Kaiwei Tang, Brooklyn, NY (US); Joseph Hollier, Brooklyn, NY (US); Hugh Alexander Wilson Francis, Brooklyn, NY (US); Alicia Kathleen Willett, Brooklyn, NY (US); Conor Jordan Davidson, Brooklyn, NY (US)

(73) Assignee: THE LIGHT PHONE INC., Brooklyn, NY (US)

( * ) Notice: Subject to any disclaimer, the term of this patent is extended or adjusted under 35 U.S.C. 154(b) by 172 days.

(21) Appl. No.: 17/181,507

(22) Filed: Feb. 22, 2021

(65) Prior Publication Data

US 2021/0266394 A1 Aug. 26, 2021

Related U.S. Application Data

(60) Provisional application No. 62/978,986, filed on Feb. 20, 2020.

(51) Int. Cl.
*H04M 1/72463* (2021.01)
*H04M 1/72454* (2021.01)
(Continued)

(52) U.S. Cl.
CPC ........ *H04M 1/72463* (2021.01); *G09G 3/344* (2013.01); *H04M 1/72454* (2021.01); *H04M 1/72469* (2021.01)

(58) Field of Classification Search
CPC ......... H04M 1/72463; H04M 1/72454; H04M 1/72469; H04M 1/0266; G09G 3/344; G06F 3/147
See application file for complete search history.

(56) References Cited

U.S. PATENT DOCUMENTS 5,930,026 A 7/1999 Jacobson et al.
7,551,899 B1 * 6/2009 Nicolas ............... H04M 1/2746
455/566

(Continued)

*Primary Examiner* — Farid Seyedvosoghi
(74) *Attorney, Agent, or Firm* — Jacob M. Ward; Ward Law Office LLC

(57) ABSTRACT

A communication device can have a main body with a persistent display, a processor, a memory, and a transceiver. The memory can be in communication with the processor and the persistent display. The memory can have a tangible, non-transitory computer readable memory with processor-executable instructions stored thereon. The processor-executable instructions can define a curated platform. The curated platform can have a plurality of modules. The plurality of modules, upon being executed by the processor, can render on the persistent display a purpose-driven graphical user interface (GUI). The purpose-driven GUI can include a plurality of interfaces with interactable objects. The transceiver can be in communication with the processor and the memory. The transceiver can be configured to permit interpersonal communication between a user of the communication device and a different user of a different device using the purpose-driven GUI.

18 Claims, 10 Drawing Sheets

(51) Int. Cl.
*G09G 3/34* (2006.01)
*H04M 1/72469* (2021.01)

(56) References Cited

U.S. PATENT DOCUMENTS

| | | | |
|---|---|---|---|
| 10,542,140 B1 | 1/2020 | Tang et al. | |
| 2010/0061662 A1* | 3/2010 | Hubner | G08B 25/016 |
| | | | 455/404.1 |
| 2010/0269057 A1* | 10/2010 | Pahlavan | H04L 63/0853 |
| | | | 709/202 |
| 2012/0216139 A1* | 8/2012 | Ording | G06F 3/04886 |
| | | | 715/773 |
| 2012/0250517 A1* | 10/2012 | Saarimaki | H04M 1/72454 |
| | | | 370/259 |
| 2012/0297304 A1* | 11/2012 | Maxwell | H04M 1/72454 |
| | | | 715/728 |
| 2013/0082824 A1* | 4/2013 | Colley | G06F 3/0482 |
| | | | 340/6.1 |
| 2014/0002365 A1* | 1/2014 | Ackley | G06F 3/0219 |
| | | | 345/173 |
| 2019/0268385 A1* | 8/2019 | Faulkner | G06F 3/0484 |

* cited by examiner

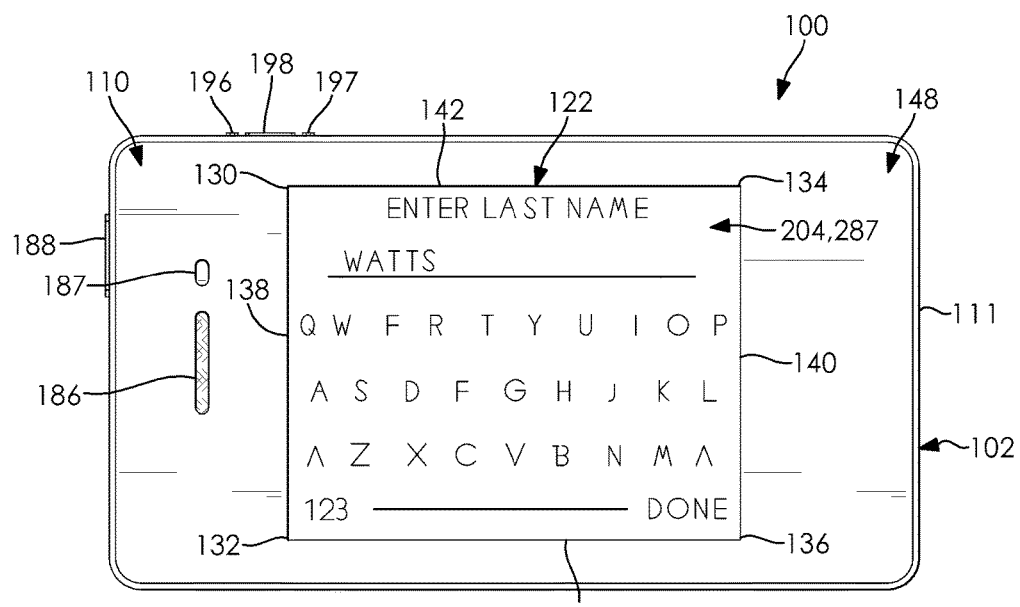
FIG. 10
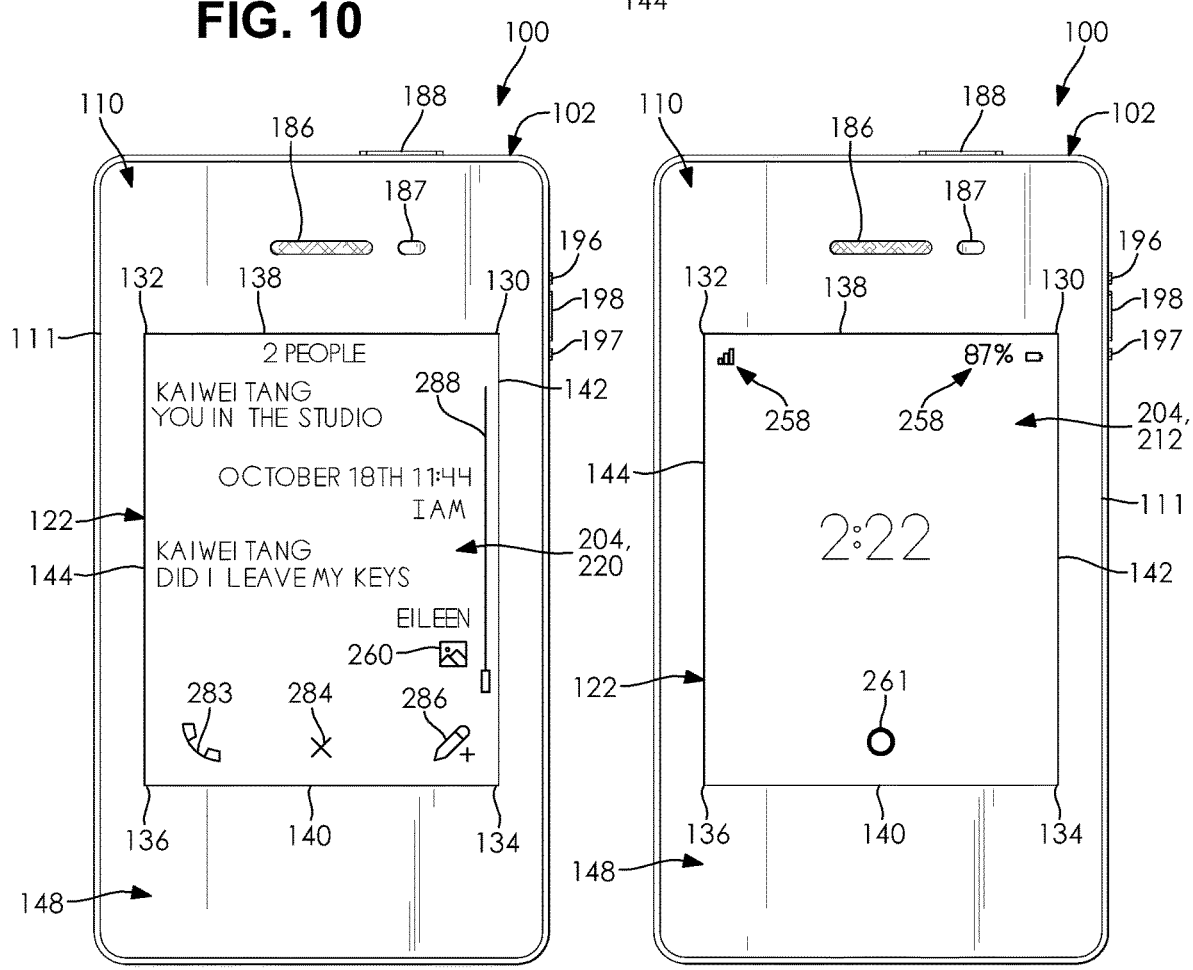
FIG. 11  FIG. 12

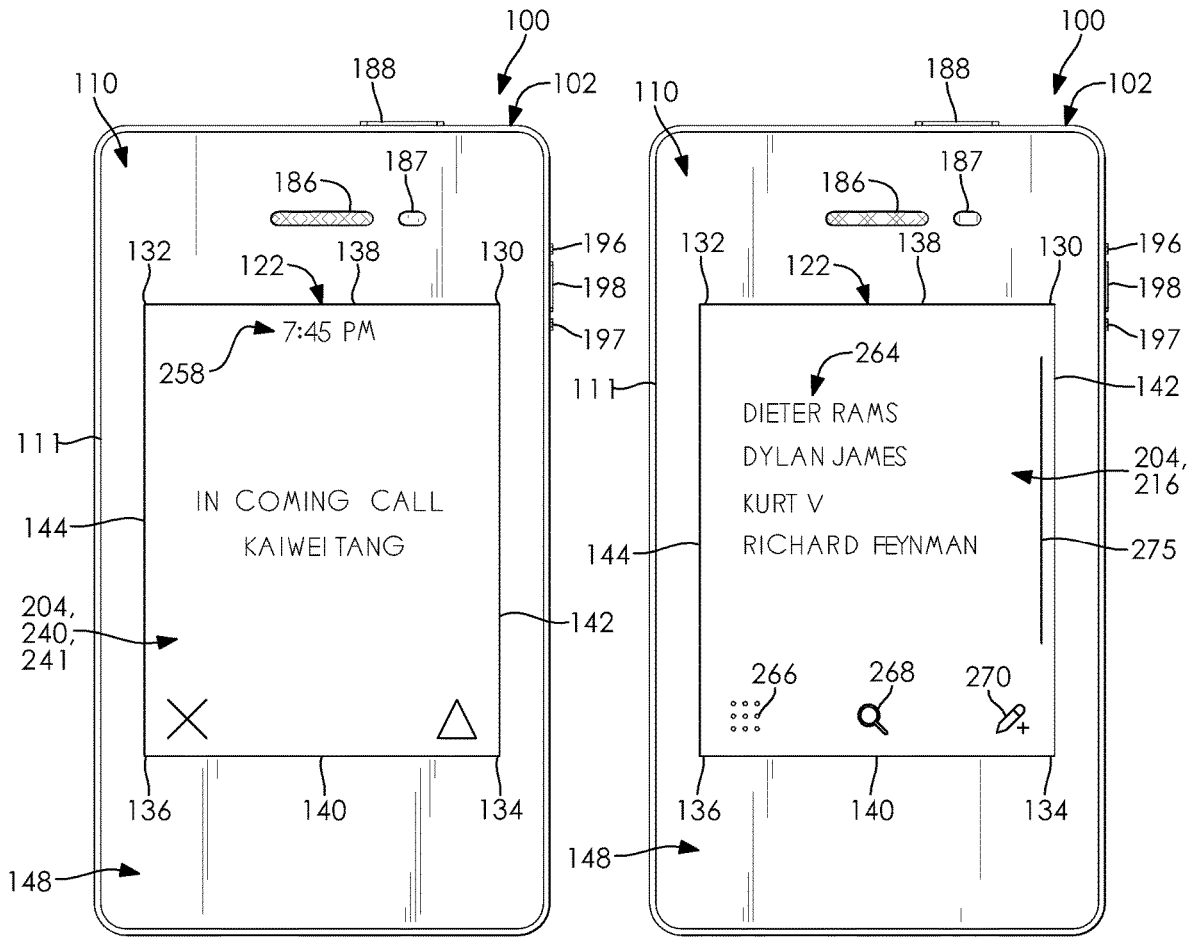
FIG. 15  FIG. 16
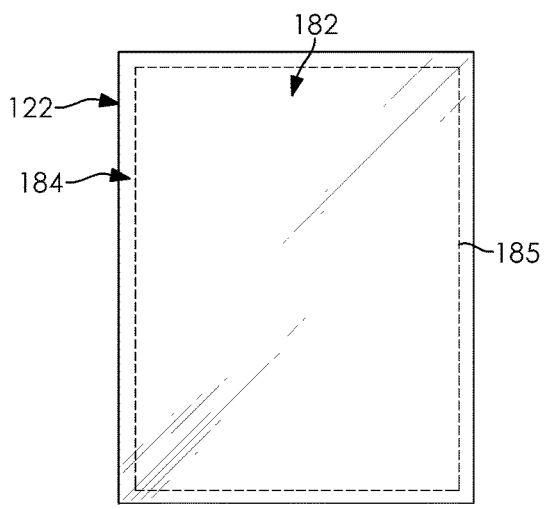
FIG. 17

COMMUNICATION DEVICE WITH A PURPOSE-DRIVEN GRAPHICAL USER INTERFACE, GRAPHICS DRIVER, AND PERSISTENT DISPLAY

CROSS-REFERENCE TO RELATED APPLICATIONS

This application claims the benefit of U.S. Provisional Application Ser. No. 62/978,986, filed on Feb. 20, 2020. The entire disclosure of the above application is hereby incorporated herein by reference.

FIELD

The present disclosure relates to a communication device and, more particularly, to a purpose-driven mobile phone with minimalist features that facilitates distraction-free navigation.

INTRODUCTION

This section provides background information related to the present disclosure which is not necessarily prior art.

Due to rapid technical developments, mobile devices, such as smartphones, have increasingly become bloated with extra features and applications. These features and applications add little to the user experience and just lead to user frustration due to adding needless complexities in relation to interactions with the devices. These complexities can also make smartphones inaccessible to younger users and the elderly.

Also, many of the known smartphone applications have mechanics and methodologies that intentionally draw the attention of a user away from their current task, or which may distract the user. Undesirably, this can result in loss of productivity and quality of life. In addition, smartphones can be resource intensive and have limited battery life. Undesirably, this can result in the user having to charge the device many times during a day, or having to buy additional or external batteries.

One possible solution for increased battery life involves utilizing lower powered displays, such an electronic paper display. Many electronic paper displays can display static text and images indefinitely without electricity. Unfortunately, electronic paper displays have many known disadvantages. In particular, electronic paper displays can require screen refreshes. In addition, electronic paper displays can have lower refresh rates than typical modern display units, such as liquid-crystal displays (LCD). Undesirably, this can hinder the user experience, by limiting the amount of display feedback that can be provided to the user. While this can be acceptable for a device in which the primary purpose is data consumption, like an e-reader, this can severely inhibit use of a communication device in which the primary purpose involves data entry, like a mobile phone.

For example, many mobile phones use visual feedback to alert the user that their input was received. These types of display feedback are not possible or are unreasonable to implement on electronic paper displays because of the low refresh rate and screen latency associated with electronic paper displays.

There is a continuing need for a communication device with a purpose-driven graphical user interface that militates against distractions associated with modern smartphone designs. Desirably, the communication device can utilize a persistent display while still providing sufficient feedback to an input from a user.

SUMMARY

In concordance with the instant disclosure, a communication device with a purpose-driven graphical user interface (GUI) that militates against distractions associated with modern smartphone designs, and which can utilize a persistent display while still providing sufficient feedback to an input from a user, has been surprisingly discovered.

In certain embodiments, a communication device has a main body with a persistent display, a processor, a memory, and a transceiver. The memory can be in communication with the processor and the persistent display. The memory can have a tangible, non-transitory computer readable memory with processor-executable instructions stored thereon. The processor-executable instructions can define a curated platform. The curated platform can have a plurality of modules. The plurality of modules, upon being executed by the processor, can render on the persistent display a purpose-driven graphical user interface (GUI). The purpose-driven GUI can include a plurality of interfaces with interactable objects. The transceiver can be in communication with the processor and the memory. The transceiver can be configured to permit interpersonal communication between a user of the communication device and a different user of a different device using the purpose-driven GUI.

In certain embodiments, communication devices can have a main body with a persistent display, a processor, a memory, a transceiver. The memory can be in communication with processor and the persistent display. The memory can have a tangible, non-transitory computer readable memory with processer-executable instructions stored thereon. The processor-executable instructions can define a curated platform. The curated platform can have a plurality of modules. The plurality of modules, upon being executed by the processor, render on the persistent display a purpose-driven graphical user interface (GUI). The purpose-driven GUI can include a plurality of interfaces with interactable objects. Each of the plurality of modules can be configured to generate a refresh request, when a user interacts with one of the interactable objects rendered on the persistent display. The curated platform can further have a graphics driver. The graphics driver can be configured to receive the refresh request from one of the plurality of modules that is rendering an active interface of the plurality of interfaces. The active interface can display content. The graphics driver can be further configured to refresh the active interface when receiving the refresh request. Refreshing of the active interface can include removing at least one of a portion and an entirety of the content displayed on the active interface. The transceiver can be in communication with the processor and the memory. The transceiver can be configured to permit interpersonal communication between a user of the communication device and a different user of a different device using the purpose-driven GUI.

In certain embodiments, communication devices can have a main body with a persistent display, a processor, a memory, and a transceiver. The display can have a haze level of between 52 percent and 66 percent. The memory can be in communication with the processor and the persistent display. The memory can have a tangible, non-transitory computer readable memory with processor-executable instructions stored thereon. The processor-executable instructions can define a curated platform. The curated platform can have a plurality of modules. The plurality of modules, upon being executed by the processor, can render on the persistent display a purpose-driven graphical user interface (GUI). The purpose-driven GUI can include a plurality of interfaces with interactable objects. The transceiver can be in communication with the processor and the memory. The transceiver can be configured to permit interpersonal communication between a user of the communication device and a different user of a different device using the purpose-driven GUI.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

FIG. 10 is a front elevational view of the communication device shown in FIGS. 1-7 and 9, and showing the communication device rotated counterclockwise by ninety degrees, and further showing a digital keyboard interface being rendered on the persistent display in a landscape orientation;

FIG. 11 is a front elevational view of the communication device shown in FIGS. 1-7 and 9-10, and further showing a conversation interface being rendered on the persistent display;

FIG. 12 is a front elevational view of the communication device shown in FIGS. 1-7 and 9-11, and further showing a home interface being rendered on the persistent display;

FIG. 15 is a front elevational view of the communication device shown in FIGS. 1-7 and 9-14, and further showing an incoming call interface being rendered on the persistent display;

FIG. 16 is a front elevational view of the communication device shown in FIGS. 1-7 and 9-15, and further showing a phone interface being rendered on the persistent display;

FIG. 17 is a front elevational view of the persistent display shown in FIGS. 1-16, and further showing an active area and a passive area of the persistent display;

FIG. 18 is a schematic illustration of a communication network including the communication device according to one embodiment the present disclosure, and further showing a processor, a memory, and a haptic feedback system of the communication device, the memory shown containing a graphics driver according to certain embodiments of the disclosure;

Figure 20:
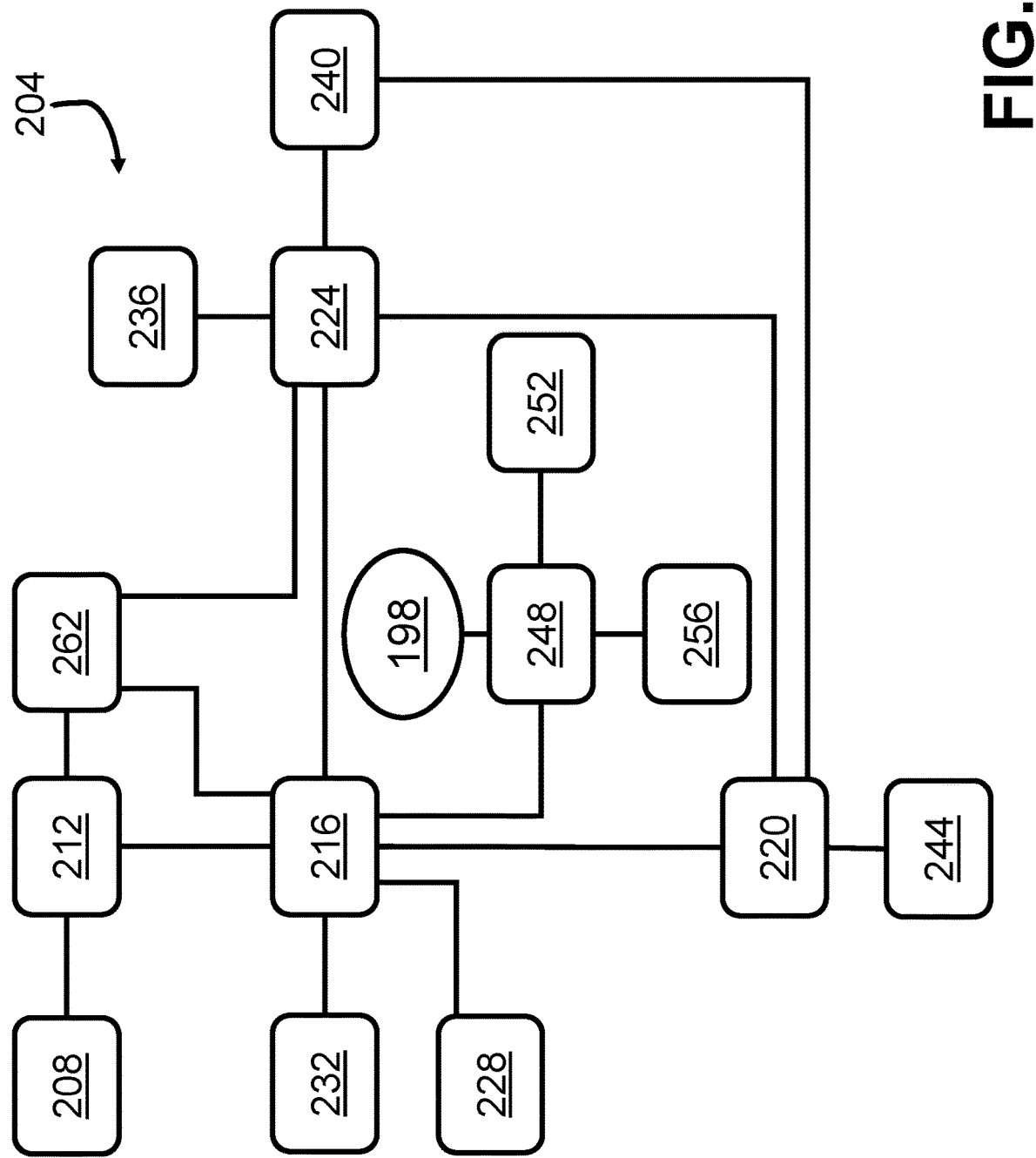
Figure 21:
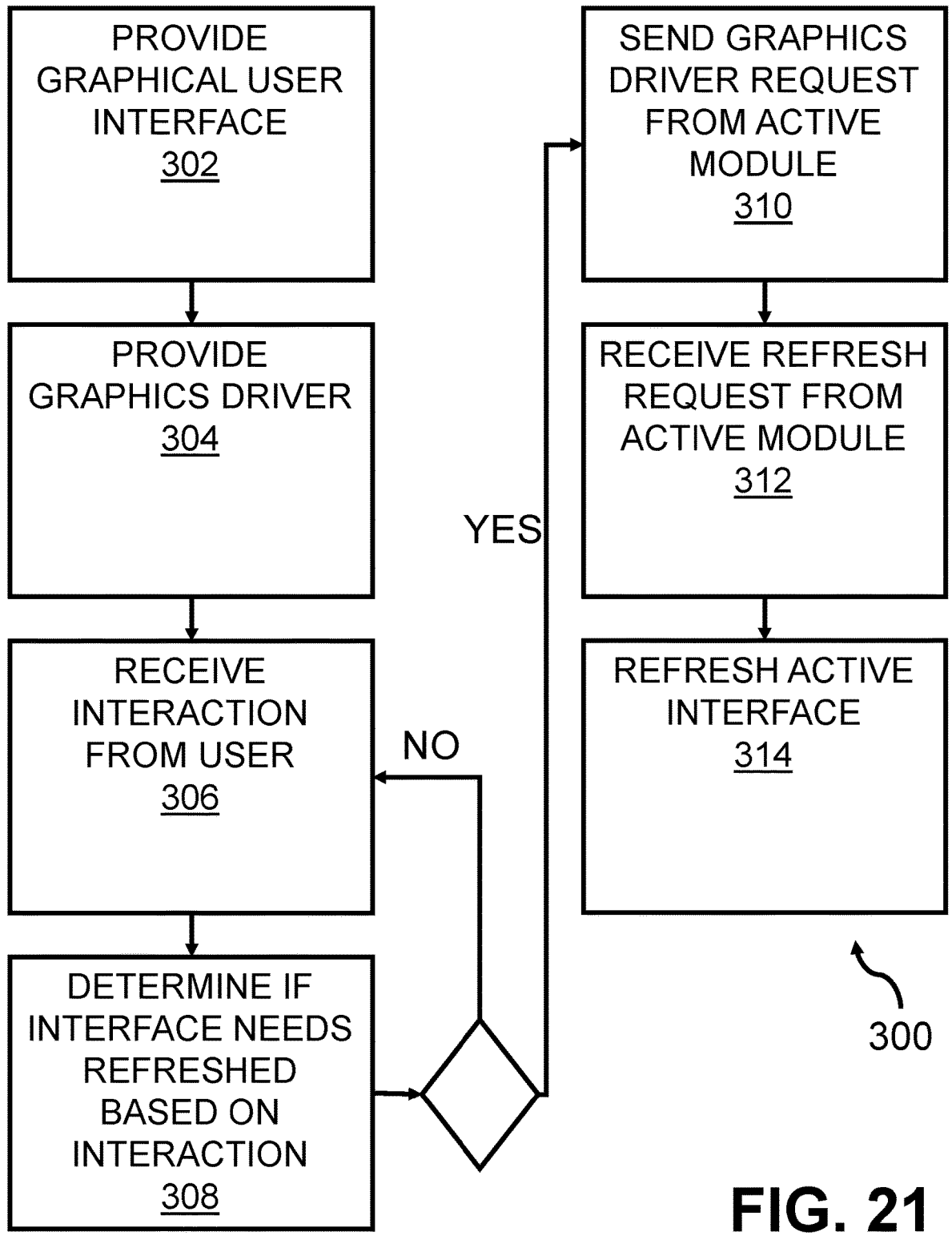

FIG. 20 is a schematic illustration of a purpose-driven graphical user interface (GUI) according to one embodiment of the present disclosure, and further showing a plurality of interfaces of the purpose-driven GUI that can be rendered on the persistent display and inter-navigation between the interfaces of the purpose-driven GUI; and FIG. 21 is a flowchart illustrating a method of using the graphics driver of the communication device shown in FIG. 18, according to one embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As defined herein, the term "interface" relates to the physical representation and arrangement of a graphical user interface visually rendered on a display.

As defined herein, the terms "icon" and "interactable object" relates to the physical representation and arrangement of a visually rendered element included in an interface that can be interacted with by a user by contacting an associated area of an input medium such as a touch screen display.

With reference to FIGS. 1-7, 9-16, and 18, a communication device 100 is shown. The communication device 100 can be used to permit interpersonal communication between a user of the communication device 100 and a different user of a different device 103, for example, as shown in FIG. 18. Non-limiting examples of the communication device 100 can include a mobile device, a tablet, and a personal computer. However, it should be appreciated that the other forms of the communication device 100 are contemplated and considered to be within the scope of the present disclosure.

In certain examples, the communication device 100 can be a mobile device capable of establishing communication to the different device 103 registered through a communication network 101. The communication network 101 can include least one of heterogenous pots, cellular, and VIOP/SIP providers, such as the systems discussed in U.S. Pat. No. 10,542,140, the entire disclosure of which is hereby incorporated herein by reference.

Figure 3:
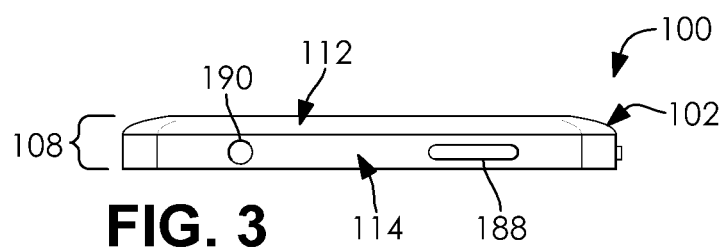
FIG. 3 is a top plan view of the communication device shown in FIGS. 1-2, and further showing an audio port and a power button.

While referencing FIGS. 1-7 and 9-16, the communication device 100 can include a main body 102. The main body 102 may be sized and shaped appropriately for use as a handheld unit, for example. The main body 102 can be manufactured from plastic, wood, metal, or a composite material. It should be appreciated that a skilled artisan can select other materials for the main body 102, within the scope of this disclosure. In addition, the main body 102 can also have a main body length 104 (FIG. 6), a main body width 106 (FIG. 4), and a main body depth 108 (FIG. 3). In certain examples, the main body length 104 can be about ninety-five (95.85) millimeters. The main body width 106 can be about fifty-five (55.85) millimeters. Also, the main body depth 108 can be about eight (8.75) millimeters. Although these dimensions of the main body 102 have been shown to be useful, other suitable dimensions can be selected by a person skilled in the art.

Now referring to FIGS. 1-7, the main body 102 can include a front side 110, a rear side 112, a top side 114, a bottom side 116, a left side 118, and a right side 120. In certain examples, the main body 102 can further include a persistent display 122, as shown in FIGS. 1-7, and also a processor 124, a memory 126, and a transceiver 128, as shown in FIG. 18. The persistent display 122 can be configured to permit a user to interact with the communication device 100. The persistent display 122 can include technologies that can hold static text and images indefinitely without electricity. Non-limiting examples can include GYRICON™ displays, electrophoretic displays, microencapsulated electrophoretic displays, electrowetting displays, electrofluid displays, interferometric modular displays, plasmonic electronic displays, electronic paper displays, and other types of displays having electrochromism. However, it should be appreciated that a skilled artisan can employ different suitable types of persistent displays 122, as desired.

Figure 1:
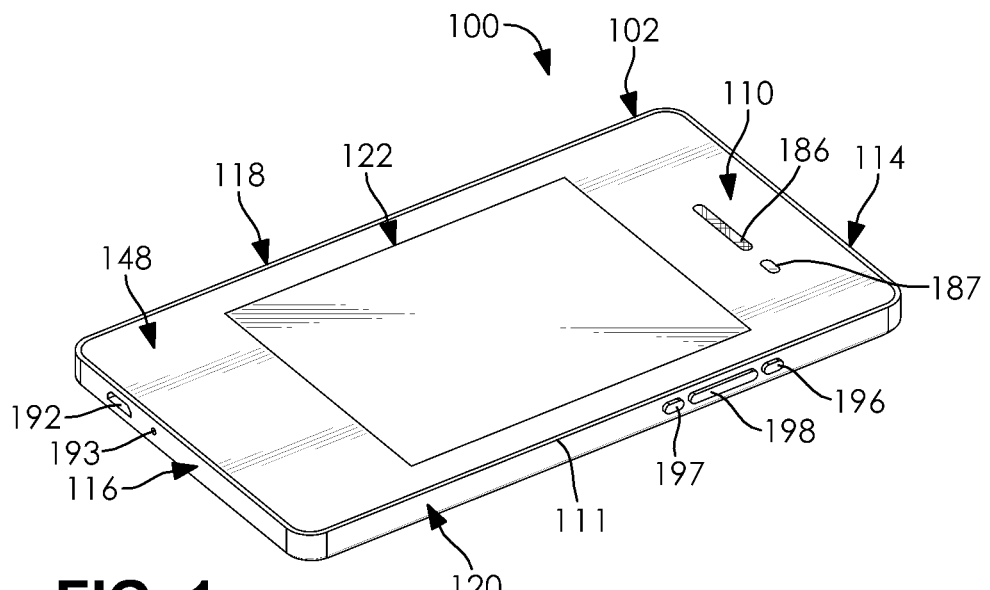
FIG. 1 is a front perspective view of a communication device according to one embodiment of the present disclosure, and further showing a main body with a front side having a persistent display.
Figure 2:
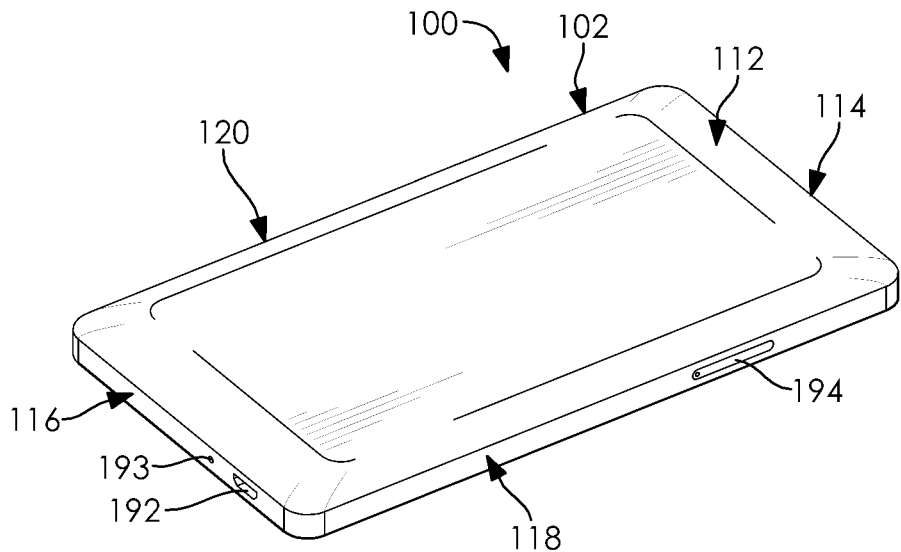
FIG. 2 is a rear perspective view of the communication device shown in FIG. 1, and further showing a rear side of the persistent display.
Figure 9:
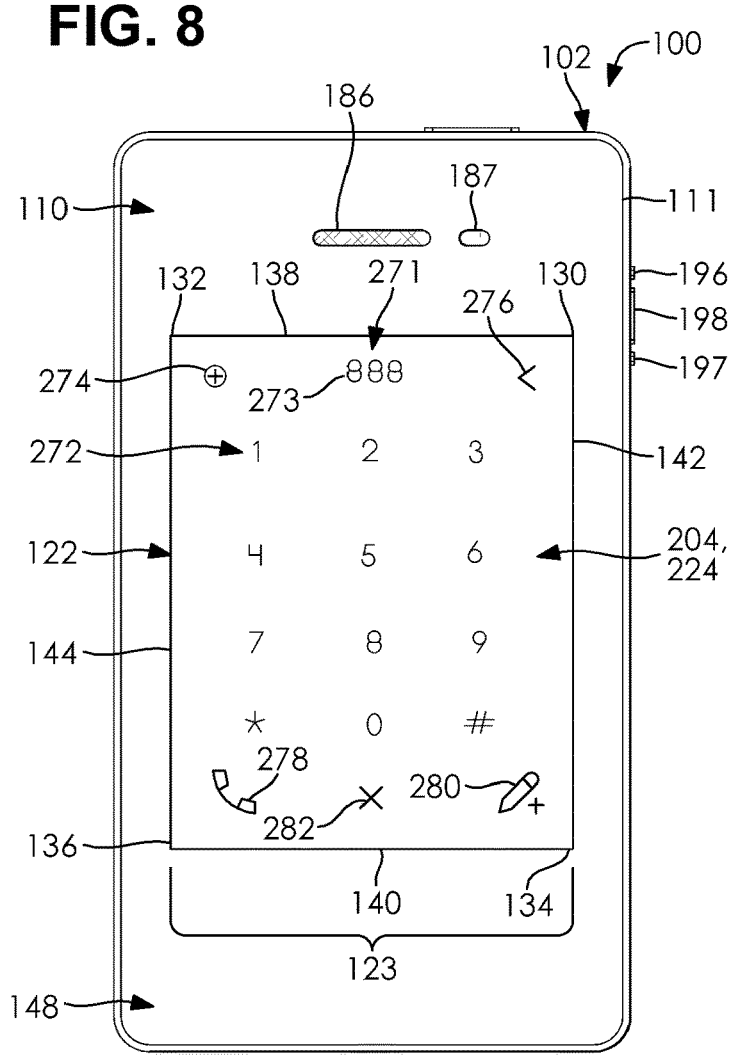
FIG. 9 is a front elevational view of the communication device shown in FIGS. 1-7, and further showing a dialer interface being rendered on the persistent display.

The persistent display 122 can be disposed on the front side 110 of the main body 102, as shown in FIG. 1. With reference to FIGS. 9, 11, and 16, the persistent display 122 can include a top right corner 130, a top left corner 132, a bottom right corner 134, a bottom left corner 136, a top border 138, a bottom border 140, a right border 142, and a left border 144.

In most particular embodiments, the persistent display 122 has a predetermined refresh rate. The refresh rate can be a variable refresh rate. In some examples, the persistent display 122 can have a low refresh rate display. In certain examples, the refresh rate can be below thirty (30) frames per second. In some instances, the refresh rate can be below fifteen (15) frames per second. In other examples, the refresh rate can be below five (5) frames per second. It should be appreciated that the one skilled in the art can select other suitable rates for the refresh rate, within the scope of this disclosure.

In certain examples, the persistent display 122 can include an electronic paper display. A non-limiting example can include a E INK® display. Electronic paper displays can render an image or text by moving ink particles to the surface of the display and arranging them into patterns. Once the ink particles of a pixel are in place, the ink particles can remain in place until the next electric charge rearranges the ink particles into another pattern. Further information be found in U.S. Pat. No. 5,930,026, the entire disclosure of which is hereby incorporated herein by reference.

Advantageously, the electronic paper display has low power requirements, high visibility, high contrast, and a wide viewing angle. In addition, it is believed that electronic paper displays can militate against distractions by not supporting a wide range of colors and high resolutions that can undesirably grab the attention of the user.

Figure 7:
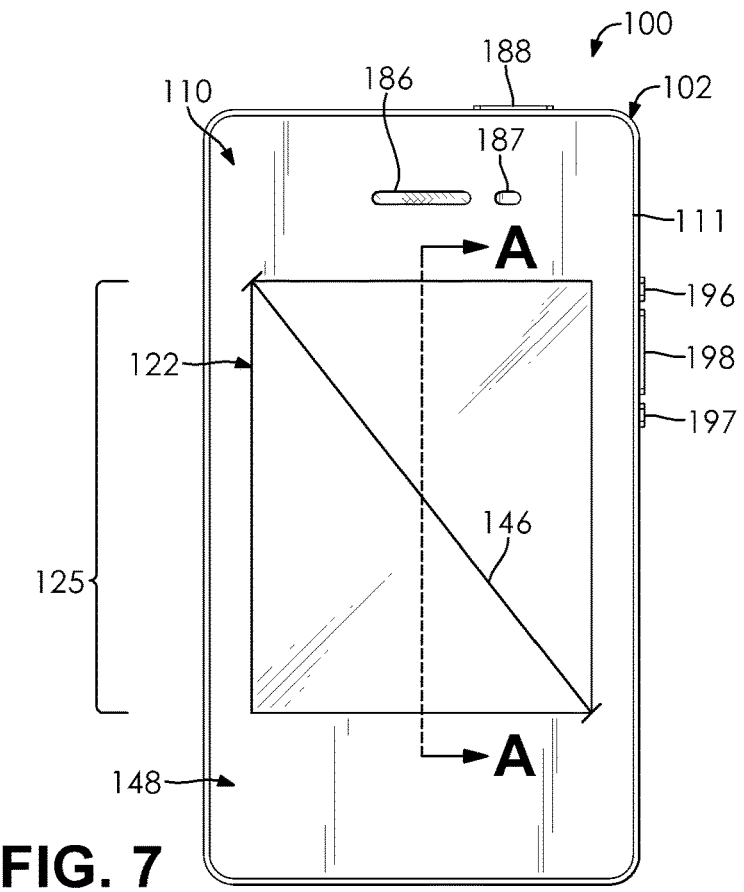
FIG. 7 is a front elevational view of the communication device shown in FIGS. 1-6, and further showing the persistent display.

With reference to FIG. 7, the persistent display 122 can have a diagonal length 146. In certain examples, the diagonal length 146 is about three inches (2.84"). In addition, the resolution can be about six hundred pixels (600 px) by four hundred eighty pixels (480 px). However, although these particular diagonal lengths and resolutions have been shown to be useful, it should be appreciated that other suitable dimensions and resolutions can be employed by a skilled artisan, as desired.

It should be appreciated that the persistent display 122 can substantially cover an entirety of the front side 110 of the communication device 100. In certain examples, the persistent display 122 only covers a portion of the front side 110, as shown in FIGS. 1, 7, and 9-16. In addition, the front side can be surrounded by a frame 111. The frame 111 may be folded over at a peripheral edge thereof in order to securely hold the persistent display 122 within the main body 102. Other suitable configurations for the frame 111 may also be employed within the scope of the disclosure.

Figure 8:
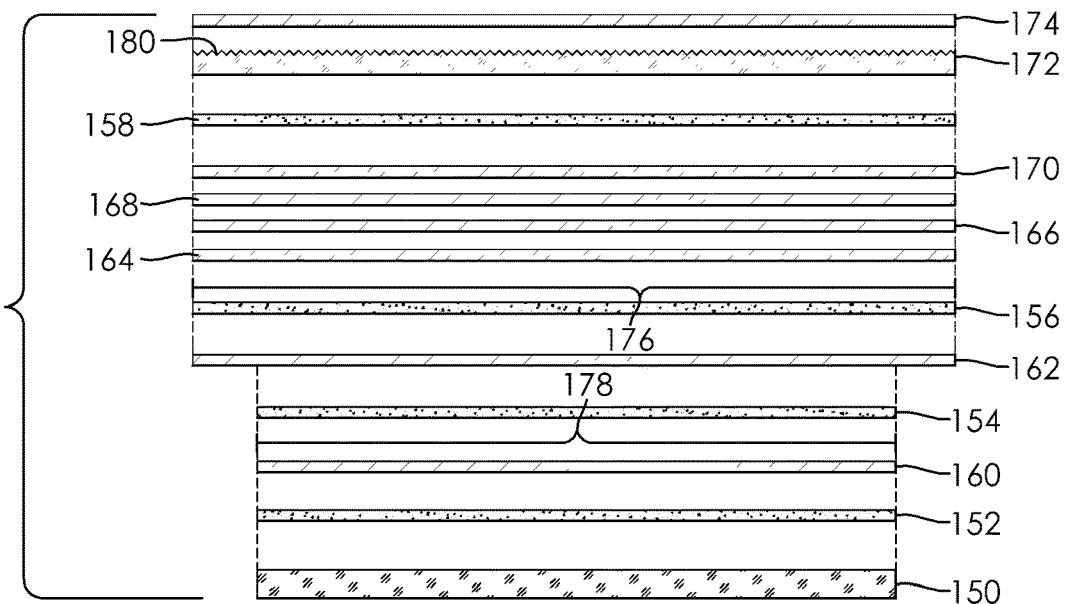
FIG. 8 is a cross-sectional side elevational view of the communication device taken at section line A-A in FIG. 7, with the main body not shown and further showing a base display panel with a plurality of layers forming the persistent display.

With reference to FIG. 8, the persistent display 122 can include a display base panel 150 and a plurality of layers that facilitate an interaction of the user with a graphical user interface (GUI, shown in FIG. 18) of the communication device 100. It should be appreciated that FIG. 8 only shows the display base panel 150 and the plurality of layers, and does not show the main body 102 for simplicity of illustration.

Conventionally, smart phones have had layers of materials disposed on a display unit in order to have to protect the display unit; have anti-fingerprint qualities; or have touchscreen capabilities. However, undesirably, these layers of material can produce undesirable shadows, poor colorization, and have undesirable light reflection.

It has been surprisingly found that the plurality of layers can militate against these issues by using a predetermined combination of glass haze and coatings. This permits the plurality of layers to modify the visual appearance of the persistent display 122 in such a way that makes the front side 110 of the communication device 100 appear to have a substantially seamless surface. This can be especially desirable when used in combination with the persistent display 122 of the present disclosure to make refreshing the persistent display 122 less jarring. In addition, the plurality of layers as described further herein can modify the visual appearance of the persistent display 122 to appear to have a substantially uniform appearance.

While still referring to FIG. 8, the plurality of layers can include at least one of optical clear adhesive (OCA) layers 152, 154, 156, including a first OCA layer 152, a second OCA layer 154, a third OCA layer 156, and a fourth OCA layer 158; a front light film layer 160; a capacitive film layer 162; a blackout paint layer 164; a color paint layer 166; a nonconductive vacuum metallization (NCVM) layer 168; a film layer 170; a glass layer 172; and an anti-fingerprint coating layer 174. Although the employment of these various layers, arranged as described herein, has been found particularly advantageous, it should be appreciated that a skilled artisan can employ different layers for the front side 110 of the communication device 100, as desired.

The OCA layers 152, 154, 156 can be configured to bind different layers together to improve durability and optical characteristics. A non-limiting example of the OCA layers 152, 154, 156 can include OCA developed by STROUSE™. As shown in FIG. 8, the first OCA layer 152 can be disposed on the display base panel 150, and more particularly between the display base panel 150 and the glass layer 172. In certain examples, the first OCA layer 152 can be disposed between the display base panel 150 and the front light film layer 160. The second OCA layer 154 can be disposed on the front light film layer 160, and more particularly between the front light film layer 160 and the glass layer 172. In certain examples, the second OCA layer 154 can be disposed between the front light film layer 160 and the capacitive film layer 162. The third OCA layer 156 can be disposed on the capacitive film layer 162, and more particularly between the capacitive film layer 162 and the glass layer 172. In certain examples, the third OCA layer 156 can be disposed between the blackout paint layer 164 and the capacitive film layer 162. The fourth OCA layer 158 can be disposed on the film layer 170, and more particularly between the film layer 170 and the glass layer 172.

The front light film layer 160 can be configured to illuminate the persistent display 122. The front light film layer 160 can include a light-emitting diode (LED) layer. In certain examples, the front light film layer 160 can include at least one of an LED light and a light guide. The LED light can provide light that can be directed toward the persistent display 122. The light guide can disperse the light adequately across the persistent display 122. Desirably, this can permit the persistent display 122 to be viewable in dark situations. This can be particularly useful when the persistent display 122 is an E INK® display that does not have a traditional backlight like displays found in traditional smartphones. The front light film layer 160 can be disposed on the first OCA layer 152, and more particularly between the first OCA layer 152 and the glass layer 172. In certain examples, the front light film layer 160 can be disposed between the first OCA layer 152 and the second OCA layer 154. It should be appreciated that the front light film layer 160 may not be employed if the persistent display 122 includes a backlight.

The capacitive film layer 162 can be configured to detect various inputs from the user. Desirably, the capacitive film layer 162 allows the persistent display 122 to function as a touchscreen for the communication device 100, thereby allowing the user to manually interact with and operate the communication device 100 using their fingers. The capacitive film layer 162 can include at least one of surface capacitive technologies and projected capacitive technologies. The capacitive film layer 162 can be disposed on the second OCA layer 154, and more particularly between the second OCA layer 154 and the glass layer 172. In certain examples, as shown in FIG. 8, the capacitive film layer 162 can be disposed between the second OCA layer 154 and the third OCA layer 156. It should be appreciated that a person skilled in the art can employ different technologies for the capacitive film layer 162, within the scope of this disclosure.

The blackout paint layer 164 can be configured to militate against the front light film layer 160 from shining through the edges of the front side 110 of the communication device 100, when the light of the front light film layer 160 is turned on. Desirably, this focuses the light of the front light film layer 160 on the persistent display 122 and militates the user from getting distracted by light bleeding through the edges of the front side 110 of the communication device 100. The blackout paint layer 164 can be disposed on the third OCA layer 156, and more particularly between the third OCA layer 156 and the glass layer 172. In certain examples, the blackout paint layer 164 can be disposed between the third OCA layer 156 and the color paint layer 166.

The blackout paint layer 164 can have a blackout length 176 and the front light film layer 160 can have a front light length 178, for example, as shown in FIG. 8. In certain examples, the blackout length 176 is longer than the front light length 178. Desirably, this can permit the blackout paint layer 164 to militate against the light of the front light film layer 160 bleeding through the edges of the front side 110 of the communication device 100.

With reference to FIG. 9, the front side can include a painted area 148. The painted area 148 does not include the persistent display 122 and can instead surround or circumscribe the persistent display 122. The painted area 148 can include at least one of the color paint layer 166, the NCVM layer 168, and the film layer 170. The painted area 148 can be configured to match the glass layer 172 to the persistent display 122 in terms of color and reflection. It is believed matching the glass layer 172 to the persistent display 122 provides for a more aesthetically pleasing and less distracting experience for the user. In addition, this also can provide for a more seamless looking front side 110 of the communication device 100, which can militate against the user from being distracted from noticing seams on the front side 110 of the communication device 100. The color paint layer 166 can be disposed on the blackout paint layer 164, and more particularly between the blackout paint layer 164 and the glass layer 172. In certain examples, the color paint layer 166 can be disposed between the blackout paint layer 164 and the NCVM layer 168. The NCVM layer 168 can be disposed on the color paint layer 166, and more particularly between the color paint layer 166 and the glass layer 172. In certain examples, the NCVM layer 168 can be disposed between the color paint layer 166 and the film layer 170. The film layer 170 can be disposed on the NCVM layer 168, and more particularly between the NCVM layer 168 and the glass layer 172. In certain examples, the film layer 170 can be disposed between the NCVM layer 168 and the fourth OCA layer 158.

In certain examples, the first OCA layer 152, the front light film layer 160, and the third OCA layer can only be disposed on the display base panel and not the painted area. In addition, in certain examples, the capacitive film layer 162, the third OCA layer 156, the blackout paint layer 164, the color paint layer 166, the NCVM layer 168, the film layer 170, the fourth OCA layer 158, the glass layer 172, and the anti-fingerprint coating layer can be disposed across the entire front side 110 of the communication device 100.

The glass layer 172 can be configured to protect the persistent display 122 from damage. Non-limiting examples of damage can include the persistent display 122 being scratched or being cracked. The glass layer 172 can include an etched surface 180 and a haze level. The haze level can be defined as the amount of light subjected to wide angle scatter. In other words, the higher the haze level, the more light is diffused or scattered when passing through the glass layer 172.

The etched surface 180 can be treated with acid to modify the haze level. This can effectively change the glass layer 172 to better reflect the light to match the persistent display 122 to the painted area 148 of the communication device 100. It should be appreciated that a skilled artisan can employ different techniques to increase or decrease the haze level of the glass layer 172.

In specific examples, the level of haze can be between about 52 percent and 66 percent. In more specific examples, the level of haze can be between about 54 percent to about 62 percent. In yet even more specific examples, the level of haze can be about 58 percent. It should be appreciated that the haze level can be scaled by one skilled in the art, as desired. In addition, the font and character size of what is currently being displayed on the persistent display 122 can be chosen based on the haze level of the glass layer 172 to prevent text from looking blurred and unclear. In certain examples, the font can be at least one of Akkurat Light Pro, Akkurat Pro, and Akkurat. In addition, the font size can range from 28 point to 105 point. However, it should be appreciated that one skilled in the art can select different font types and font sizes, as desired. The glass layer 172 can be disposed adjacent to the display base panel 150. In certain examples, the glass layer 172 is disposed between the fourth OCA layer 158 and the anti-fingerprint coating layer 174.

The glass layer 172 can further include painted edges. The painted edges can be configured to militate against the light from front light film layer 160 bleeding through the edges of the glass layer 172. In addition, the painted edges can provide a visually smoother transition from the glass layer 172 to the main body 102 of the communication device 100.

The painted edges can be painted a darker or lighter color. In certain examples, the painted edges can substantially match the frame 111. However, it should be appreciated that other paint types can be used to militate against light from reflecting off the painted edges.

The anti-fingerprint coating layer 174 can be configured to protect the glass layer 172, improve smoothness, and reduce fingerprints. The anti-fingerprint coating layer 174 can include an oleophobic coating, for example. However, it should be appreciated that a person skilled in the art can employ other coatings for the anti-fingerprint coating layer 174, within the scope of this disclosure. In certain examples, the anti-fingerprint coating layer 174 can be disposed on the glass layer 172.

With reference to FIG. 17, the persistent display 122 can further include an active area 182 and a passive area 184. The active area 182 and the passive area 184 are shown in FIG. 17. A dotted line 185 is shown in FIG. 17 to illustrate a border between the active area 182 and the passive area 184. The active area 182 can be configured to display the content currently being rendered on the communication device 100. The passive area 184 can be configured to render a predetermined color that substantially matches a color of the painted area 148 of the communication device 100. Advantageously, this can facilitate a smoother transition from the persistent display 122 to the painted area 148, aiding in and creating a more visually seamless appearance for the front side 110 of the communication device 100.

With reference to FIG. 18, the processor 124 can be configured to process information and execute process-executable instructions. The processor 124 can be in communication with the persistent display 122 and the memory 126. The processor 124 can be any type of general or specific purpose processor 124. In some cases, multiple processors 124 can be utilized according to other embodiments. In fact, the processor 124 can include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In certain examples, the processor 124 can be integrated on a system of a chip (SoC). A non-limiting example of the SoC can include a Qualcomm® Snapdragon™ MSM8909 manufactured by Qualcomm Technologies, Inc., headquartered in San Diego, Calif. The Qualcomm Snapdragon 210 MSM8909 is an entry level SoC for tablets and smartphones. It contains four ARM™ Cortex-A7 CPU cores (quad core) with a clock rate of up to 1.1 GHz, an Adreno™ 304 graphics card, an LPDDR2/LPDDR3 memory controller (max. 533 MHz), an eMMC 4.5 port, and an LTE Cat 4 radio module. Although the Qualcomm™ Snapdragon MSM8909 has been shown to be useful, other chipsets can be employed by a skilled artisan, as desired.

While still referring to FIG. 18, the memory 126 can be in communication with the processor 124 and the persistent display 122. The memory 126 can include a tangible, non-transitory computer readable memory 126 with the processor-executable instructions stored thereon. The memory 126 can be one or more memories and of any type suitable to the local application environment and can be implemented using any suitable volatile or nonvolatile data storage technology such as a semiconductor-based memory device, a magnetic memory device and system, an optical memory device and system, fixed memory, and removable memory. For example, the memory 126 can consist of any combination of random-access memory (RAM), read only memory (ROM), static storage such as a magnetic or optical disk, hard disk drive (HDD), or any other type of non-transitory machine or computer readable media.

The processor-executable instructions stored on the memory 126 can define a curated platform 200. The curated platform 200 can be configured to minimize distractions by not rendering on the persistent display 122 predetermined attention-grabbing applications that can distract the user. The predetermined attention-grabbing applications can include software applications that are designed to attract the attention of the user and promote "endless scrolling." Non-limiting examples of the predetermined attention-grabbing applications can include electronic mail applications, internet browser applications, social media applications, advertisements, and new feeds. It is believed that, by intentionally not rendering the predetermined attention-grabbing applications, a user will be more likely to focus on the current task and minimize the possibility of being distracted from the current task.

The curated platform 200 can have a plurality of modules 202 (shown in FIG. 19) that, upon being executed by the processor 124, render the purpose-driven graphical user interface (GUI) 204 on the persistent display 122. The purpose-driven GUI 204 can be configured to permit a user to selectively and quickly navigate the communication device 100, for example, to start a phone call, create a contact, compose a text message, respond to a text message, and other related tasks without being distracted by the predetermined attention-grabbing application.

Now referring to FIG. 20, the purpose-driven GUI 204 can have a plurality of interfaces 205 with interactable objects. In certain examples, the plurality of modules 202 includes at least one of a booting module 206 configured to render a booting interface 208 on the persistent display 122, a home module 210 configured to render a home interface 212 on the persistent display 122, a phone module 214 configured to render a phone interface 216 on the persistent display 122, a conversation module 218 configured to render a conversation interface 220 on the persistent display 122, a dialer module 222 configured to render a dialer interface 224 on the persistent display 122, a search module 226 configured to render a search interface 228 on the persistent display 122, a new message module 230 configured to render a new message interface 232 on the persistent display 122, a new contact module 234 configured to render a new contact interface 236 on the persistent display 122, a call module 238 configured to render a call interface 240 on the persistent display 122, an edit contact module 242 configured to render an edit contact interface 244 on the persistent display 122, a toolbox module 246 configured to render a toolbox interface 248 on the persistent display 122, a tool module 250 configured to render a tool interface 252 on the persistent display 122, and a setting module 254 configured to render a setting interface 256 on the persistent display 122. It should be appreciated that a skilled artisan can select different amounts and types of the modules 202, within the scope of this disclosure. Although the modules are also described herein as being discrete segments of the processor executable instructions stored on the memory 126, it should also be appreciated that each of the modules can be combined with one or more another of the modules to accomplish the same or similar functions, as desired.

With renewed reference to FIG. 18, the transceiver 128 of the communication device 100 can be in communication with the processor 124 and the memory 126. The transceiver 128 can be configured to permit interpersonal communication between the user and the different user of the different device 103 using the purpose-driven GUI 204. In certain examples, the transceiver 128 can be configured to both transmit and receive signals or information through a transmission medium. Non-limiting examples of how the transmission can be accomplished include radio waves, communication satellites, wired connections, and optical fiber systems. Although the transceiver 128 is described herein as being a single unit capable of both transmission and receipt of signals or information, it should be appreciated that a skilled artisan can employ separate methods and systems configured to transmit and receive signals or information, respectively, for the communication device 100.

Now referring to FIG. 7, the front side 110 of the main body 102 can further include a speaker 186 and a sensor 187. The speaker 186 can be configured to emit audio feedback. Non-limiting examples include audio feedback when a phone call or text has been received. In certain examples, the speaker 186 can emit audio in response to an action by the user. For example, the speaker 186 can emit audio where the user touches the persistent display 122 and the persistent display 122 detects the interacting contact and input by the user. Advantageously, the step of emitting sounds corresponding to the touch of a user assures the user that their input was received by the communication device 100, without relying on visual cues. It should be appreciated that a person skilled in the art can employ audio feedback for different functions and applications within the scope of this disclosure.

The sensor 187 can be configured to measure the ambient light and determine if there is enough ambient light for the persistent display 122 to be visible. If there is not enough ambient light, the light of the front light film layer 160 can be adjusted to ensure that persistent display 122 can be viewable by the user. In addition, the sensor 187 can be further configured to determine if a face of the user is in close proximity to the persist display 122. If the sensor 187 detects the face of the user in close proximity, the touchscreen capabilities of the capacitive film layer 162 can be temporary deactivated. Desirably, this can militate against the face of the user from accidently contacting the persistent display 122 and triggering an interactable object during a phone call. The sensor 187 can be in communication with the processor 124 and the memory 126. It should be appreciated that the sensor 187 can be a single sensor or multiple sensors, within the scope of this disclosure. In addition, it should be further appreciated that a skilled artisan can employ different functions for the sensor 187, as desired.

Referring now to FIG. 3, the top side 114 of the communication device 100 can include a power button 188 and an audio port 190. The power button 188 can be in communication with a power source or battery and configured to selectively activate or deactivate the communication device 100. In certain examples, the power button 188 can activate or deactivate the communication device 100 via holding the power button 188 for a set interval of time. The power button 188 can be further configured to enable to disable a standby mode. The standby mode can be configured to power off the persistent display 122 and enable power saving functions. In certain examples, the standby mode can be toggled by pressing the power button 188. It should be appreciated that a skilled artisan can select different functions for the power button 188, as desired.

The audio port 190 can be configured to receive a communication cable (not shown) to transfer the audio feedback to an external speaker. Desirably, this permits the user to transfer the audio feedback from the communication device 100 to the external speaker where a greater level of audio volume is desired. In certain examples, the audio port 190 can be an auxiliary (aux) port. Although the aux port has shown to be useful, different audio ports 190 can be employed by a person skilled in the art.

Figure 4:
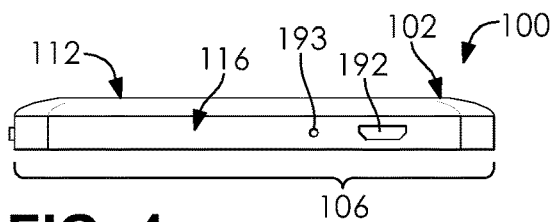
FIG. 4 is a bottom plan view of the communication device shown in FIGS. 1-3, and further showing a data cable port.

Now referencing FIG. 4, the bottom side 116 of the main body 102 can include a data cable port 192 and a microphone 193. The data cable port 192 can be in communication with the processor 124 and the memory 126. The data cable port 192 can be configured to receive a data cable. Advantageously, the data cable permits the data, which can include software updates or user settings, to be transferred between the communication device 100 and a personal computer. It should be appreciated that one skilled in the art can select other types of data to be transferred using the data cable and the data cable port 192, within the scope of this disclosure. It should be appreciated that the data cable port 192 may facilitate a recharging of the power source such as the battery within the main body 102. In certain examples, the data cable port 192 can be a micro-Universal Serial Bus (USB). Although the micro-USB has been shown to be useful, other suitable data cable ports can be selected by a skilled artisan, as desired.

The microphone 193 can be configured to receive audio from the user. A non-limiting example includes receiving audio from the user during a phone call, as a non-limiting example. In certain examples, the microphone 193 can be configured to receive voice commands from the user to at least one of compose a text message and selectively navigate to a different interface of the purpose-driven GUI 204.

Figure 6:
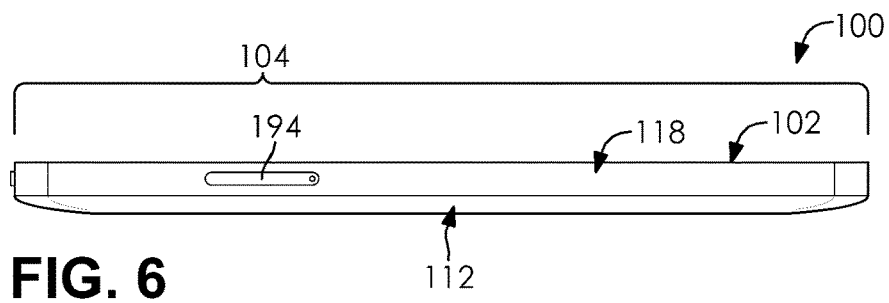
FIG. 6 is a left side elevational view of the communication device shown in FIGS. 1-5, and further showing a subscriber identification module (SIM) card port.

As shown in FIG. 6, the left side 118 of the main body 102 can include a subscriber identity module (SIM) card port 194 in communication with the processor 124 and the memory 126. The SIM card port 194 can be configured to receive a SIM card, thereby permitting the communication device 100 to connect to a cellular network. In addition, the SIM card can also be configured to hold data linking the SIM card to a particular LIGHT™ Account, which may be hosted on a system server on the communication network 101. As will be further discussed below, this can facilitate a rapid setting up of the communication device 100 prior to operation by the user.

Figure 5:
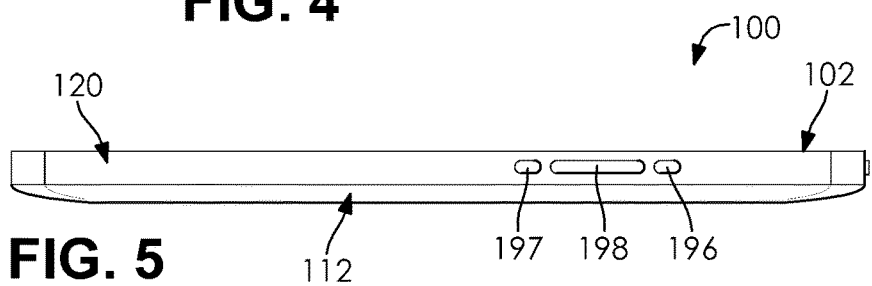
FIG. 5 is right side elevational view of the communication device shown in FIGS. 1-4, and further showing a first control button, a toolbox button, and a second control button.

With reference to FIG. 5, the right side 120 of the main body 102 can include a first control button 196, a second control button 197, and a toolbox button 198, each in communication with the processor 124 and the memory 126. The first control button 196 and the second control button 197 can be configured to act as inputs to permit the user to perform different functions. In a non-limiting example, the first control button 196 can be configured to increase the volume of the audio feedback and the second control button 197 can be configured to decrease the volume of the audio feedback. In certain examples, the first control button 196 can be configured to move a cursor left when a user is composing a message. Also, the second control button 197 can be configured to move the cursor right when a user to composing a message. It should be appreciated that one skilled in the art can employ other uses for the first control button 196 and the second control button 197, within the scope of this disclosure.

The toolbox button 198 can be configured to selectively navigate the curated platform 200 to the toolbox module 246, when pressed by the user. Desirably, this can permit the user to selectively navigate to the toolbox module 246 at any time by pressing the toolbox button 198. It should be appreciated that a person skilled in the art can employ different functions for the toolbox button 198, as desired.

Referring back to FIG. 18, the communication device 100 can further include a haptic feedback system 199 in communication with the processor 124 and the memory 126. The haptic feedback system 199 can be configured to emit vibratory feedback when sensory feedback processed by the processor 124 and the memory 126 determines that the user has contacted the persistent display 122. In certain examples, the vibratory feedback can be localized to a specific area of the persistent display 122 that the user has contacted. For example, the haptic feedback system 199 can emit vibrations each time the user contacts an interactable object being rendered on the persistent display 122. The interactable object can include at least one of a numeral, a character, and a symbol. Advantageously, the vibratory feedback assures the user that input has been received, instead of relying on visual cues on the persistent display 122. It should be appreciated that a skilled artisan can use the vibratory feedback of the haptic feedback system 199 for different functions within the scope of this disclosure.

In certain examples, the haptic feedback system 199 includes a motor which vibrates the communication device 100 upon rotation of the motor. In other examples, the haptic feedback system 199 can utilize electromagnetic induction to emit the vibratory feedback. It should be appreciated that a skilled artisan can employ different methods to achieve the vibratory feedback, as desired.

With reference to FIGS. 9-16, the purpose-driven GUI 204 can be configured to facilitate quick navigation, particularly with the low refresh rate type of the persistent display 122. This can be achieved through one or more predetermined features configured for guiding the user to focus on the current task and minimizing the possibility of distractions. In certain examples, the purpose-driven GUI 204 can guide the user to focus on the current task by intentionally not support multitasking features, such as not supporting multiple applications to be run simultaneously. It is believed such configuration can improve the speed with which the user can accomplish a given task.

Figure 14:
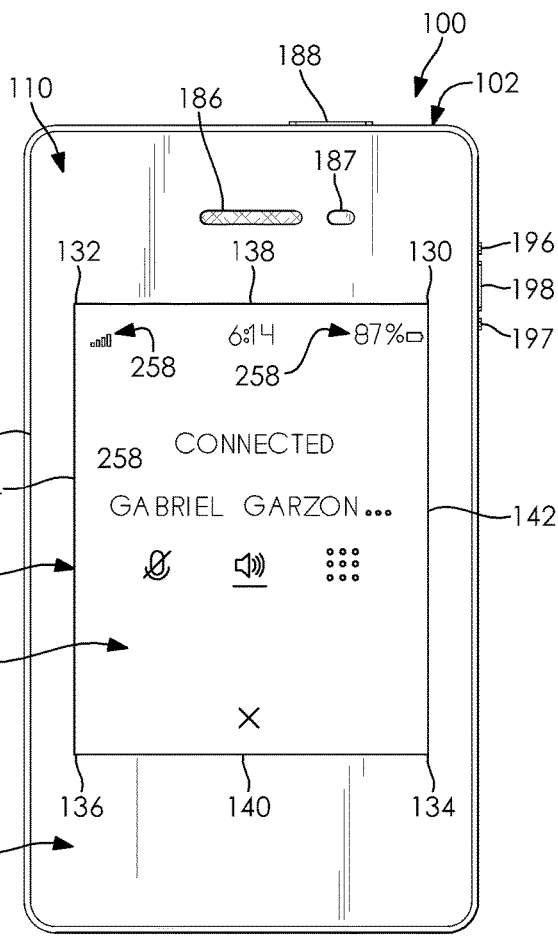
FIG. 14 is a front elevational view of the communication device shown in FIGS. 1-7 and 9-13, and further showing an ongoing call interface being rendered on the persistent display.
Figure 1B:
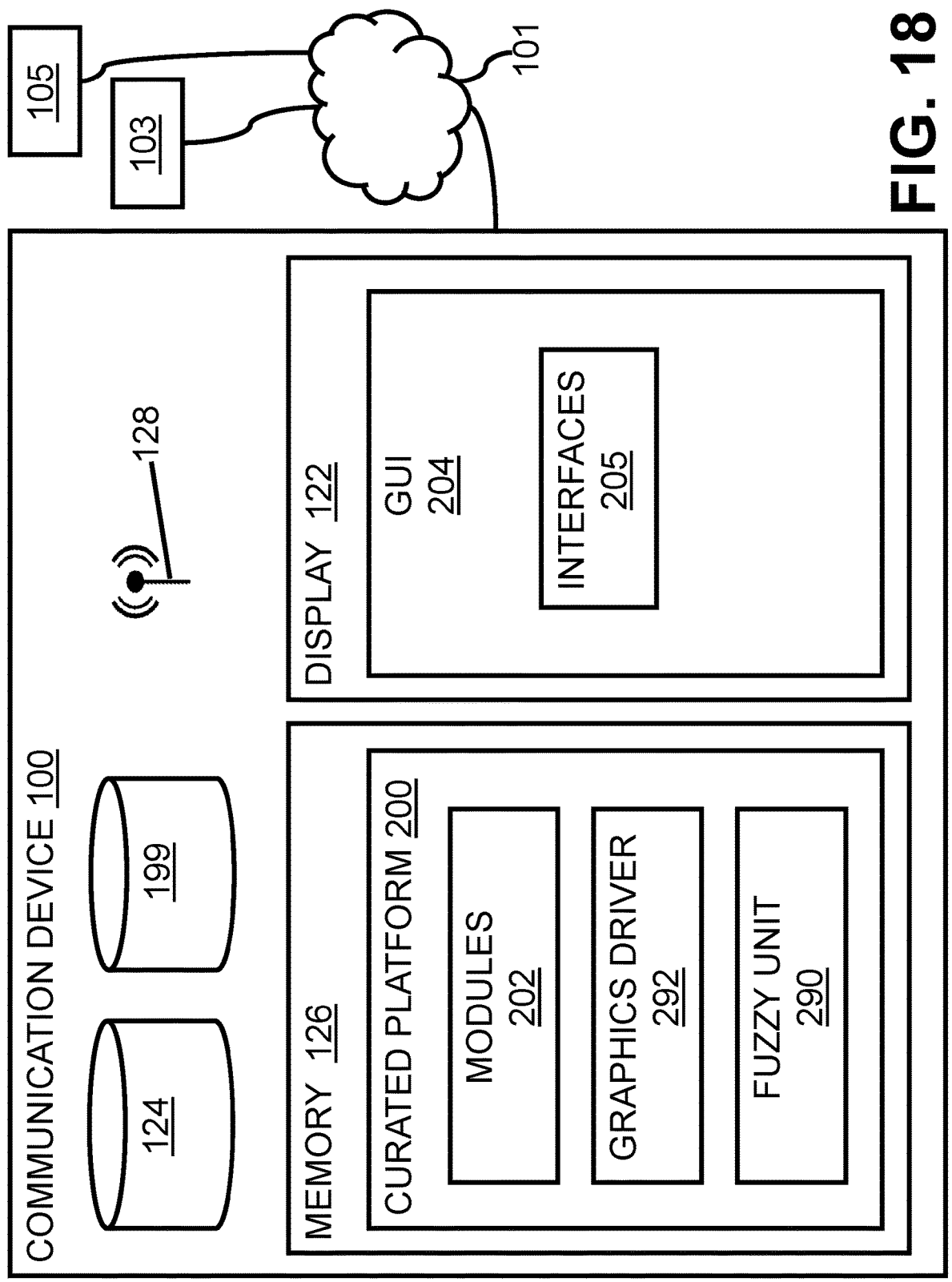

The purpose-driven GUI 204 can be configured to minimize the possibility of distractions by optimizing screen space and minimizing the number of interfaces that the user has to navigate to complete a given task. The purpose-driven GUI 204 can optimize screen space on the persistent display 122 by purposefully only showing interface icons when they are relevant to the user. For example, a set alarm icon can only be displayed when a valid time in entered. Another example of optimizing screen space can be how a display status bar 258 is shown. Since display space can limited on the persistent display 122, the display status bar 258 can only be displayed when the information is deemed necessary, for example, in the home interface 212, the setting interface 256, and the call interface 240 as shown in FIGS. 12, 14, and 15, respectively.

The purpose-driven GUI 204 can optimize screen space by not rendering certain predetermined objects on the persistent display 122. For example, in embodiments where the persistent display 122 does not support color and is low resolution, the purpose-driven GUI 204 can change how images are displayed to the user. In particular, the purpose-driven GUI 204 after receiving an image in a conversation from the different user of the different device 103, can instead display a media sent icon 260 on the persistent display 122, as shown in FIG. 11. Desirably, this can alert the user that the image was sent but does not display the image on the persistent display 122 in a low resolution state. In certain examples, the purpose-driven GUI 204 can be further configured to send an electronic email of the image to the user when the communication device 100 has received an image. Advantageously, this can permit the user to view the image at his own leisure from a personal computer or other device permitting for greater resolution display of the image.

In certain examples, if the persistent display 122 can be small enough where an icon could not be displayed properly, the purpose-driven GUI 204 can render the icon as a descriptive text in all capital letters on the persistent display 122. Desirably, this can permit the user to easily read and determine the function of the icon. In addition, the content that is displayed on the interfaces 205 can also be kept in a consistent grid with pagination. It is believed this can help optimize the refresh rate and militate against ghosting artifacts on the persistent display 122. It should be appreciated that other screen space optimizations can be employed by one skilled in the art, as desired. Additional optimizations and improvements will be described in further detail herein.

Figure 19:
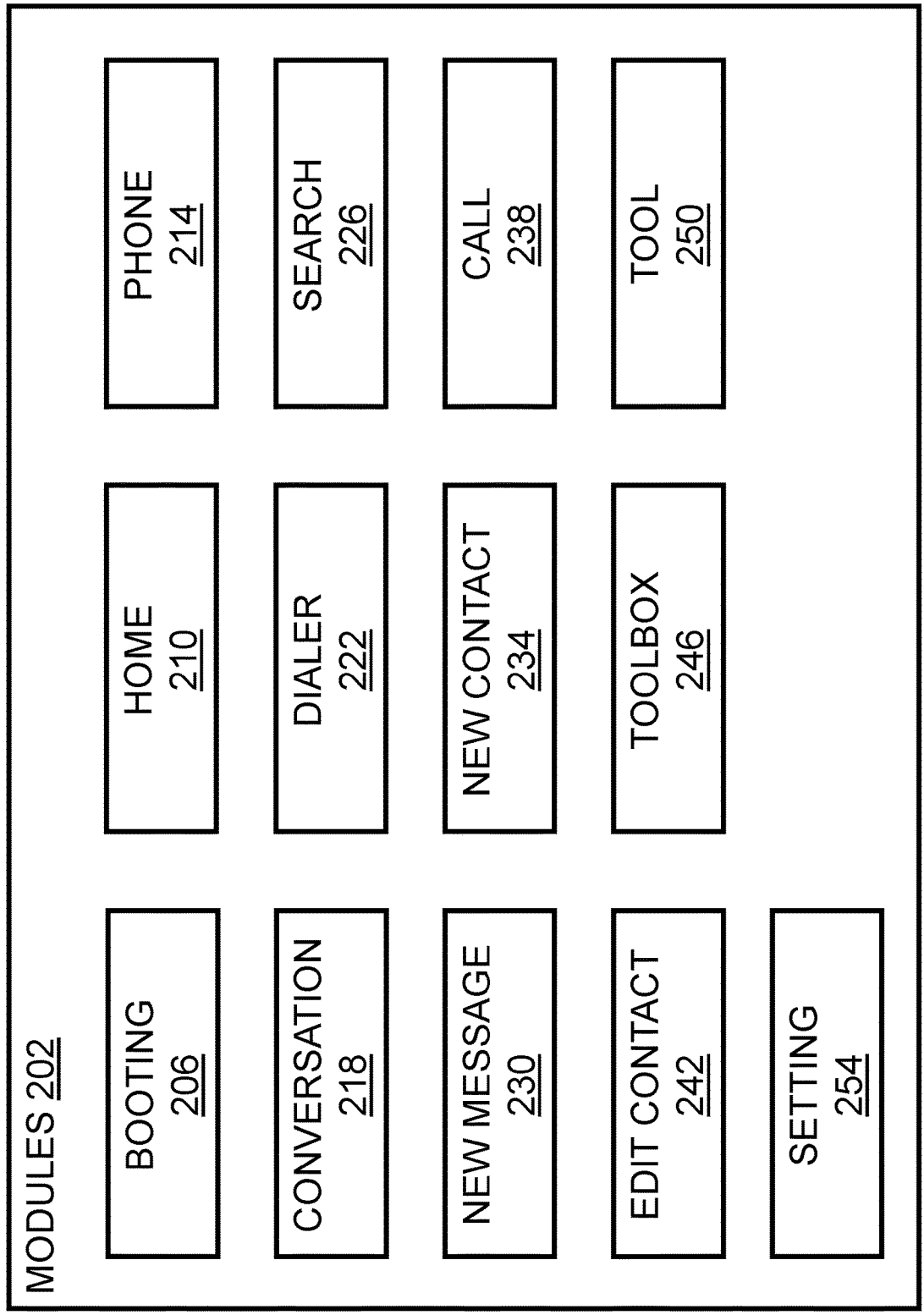
FIG. 19 is a schematic illustration of the memory of the communication device shown in FIG. 18, and further showing a plurality of modules stored on the memory of the communication device according to one embodiment of the disclosure.

With renewed reference to FIG. 19, the booting module 206 can be configured to perform at least one of an onboarding boot and a normal boot. The onboarding boot can be configured to render the booting interface 208 on the persistent display 122 when the communication device 100 is first activated by the user. Advantageously, this process can be quick, simple, and concise to aid novice users through the onboarding process. This process is kept simple to allow novice or technologically impaired users, such as the elderly or children, to complete the onboarding process without having to consult a user manual.

The onboarding boot can determine if the communication device 100 has a SIM card. If the SIM card is not detected, the onboarding boot can render an interface on the persistent display 122 to notify the user and ask for the SIM card to be inserted or for the user to enter Wi-Fi information. Then, the onboarding boot will connect to the system sever in the communication network 101 via the SIM card or through a Wi-Fi connection to perform a system update. Once the system update is completed, the onboarding boot can determine if the user has a preexisting user account, such as a LIGHT™ Account hosted on the system server in the communication network 101 by checking the SIM card. Desirably, the employment of the LIGHT™ Account on the system server in the communication network 101 can improve the user experience on the communication device 100 by permitting future software updates. Also, the LIGHT™ Account can allow contacts to be synced to a personal computer or other user device. It should be appreciated that the user account such as the LIGHT™ Account can offer other benefits to the user within the scope of this disclosure.

If the user has a preexisting user account such as the LIGHT™ Account, then the onboarding boot will render interfaces on the persistent display 122 to permit the user to login to the preexisting LIGHT™ Account. If the user does not have a preexisting LIGHT™ Account, the onboarding boot will render interfaces on the persistent display 122 to permit the user to create a LIGHT™ Account or skip creating the LIGHT™ Account. Once the user has logged into the LIGHT™ Account or skipped the creating the LIGHT™ Account, the onboarding boot can navigate the user to the normal boot.

The normal boot can be configured to put the communication device 100 into the standby mode and then selectively navigate to the home interface 212, shown in FIG. 12, where the user disables the standby mode via the power button 188. The home module 210 can be configured to render the home interface 212 on the persistent display 122. The home interface 212 can be include the display status bar. It should be appreciated that a skilled artisan can select other information to be displayed on the home module 210.

Figure 13:
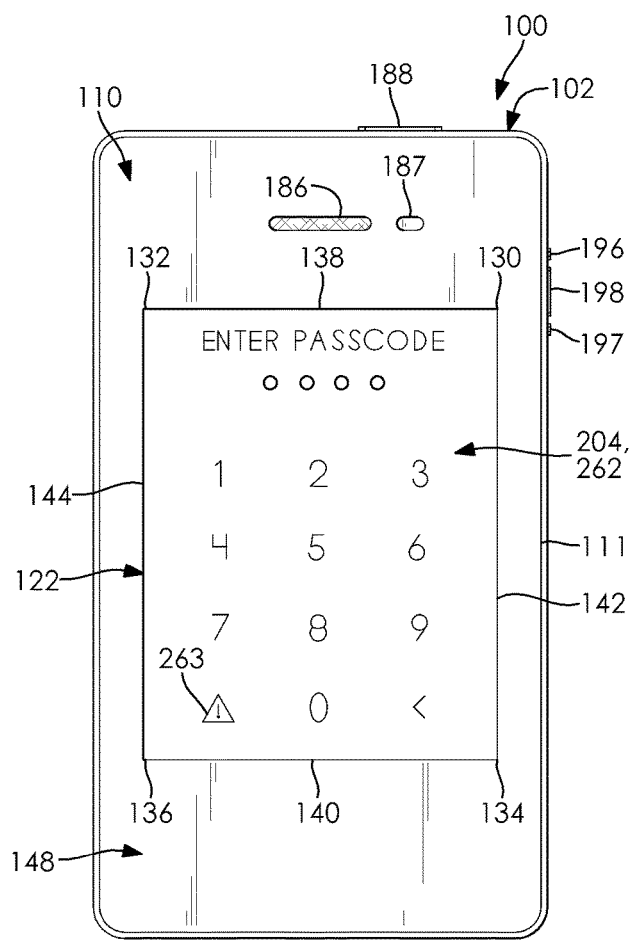
FIG. 13 is a front elevational view of the communication device shown in FIGS. 1-7 and 9-12, and further showing a password interface being rendered on the persistent display.

With continued reference to FIG. 12, the home interface 212 can also configured to permit the user to selectively navigate to the phone interface 216 upon pressing an unlock icon 261. In certain examples, the home interface 212 can be configured to display a password interface 262 and require a password to be entered to selectively navigate to the phone module 214, as shown in FIG. 13. The password interface 262 can also be configured to permit the user to selectively navigate to the dialer interface 224 via pressing an emergency icon 263 to make an emergency call without having to input the password.

Now referring to FIG. 16, the phone module 214 can be configured to render the phone interface 216 on the persistent display 122. The phone interface 216 can be configured to display a list of recent conversations 264, a dialer icon 266, a search icon 268, and a new text icon 270. It should be appreciated that a skilled artisan can employ other content to be displayed on the phone interface 216, as desired.

As further shown in FIG. 16, the list of recent conversations 264 can be displayed and aligned adjacent to the left border 144 of the persistent display 122. The list of recent conversations 264 can include at least one of contacts and unknown numbers that have already contacted the user or that the user has already contacted with. For example, if the user has already sent a contact or unknown contact number a text message, the list of recent conversations 264 may be rendered with the contact or unknown contact number. Upon pressing one of the contacts or unknown contact numbers being displayed in the list of recent conversations 264, the phone interface 216 can be configured to selectively navigate the user to the conversation interface 220, shown in FIG. 11, for reading a previous conversation. Conveniently, and desirably, displaying the list of recent conversations 264 on the phone interface 216 permits a user to quickly resume a recent conversation without having to sift through multiple interfaces. This can allow the user to remain focused on their current goal without getting distracted by having to sift through multiple interfaces.

In certain examples, the list of recent conversations 264 can be ordered by the which conversation has had the most recent event. For example, as shown in FIG. 16, if a particular conversation has received a new text message, that conversation would be listed at the top of the list of the recent conversations. In addition, the phone interface 216 can include a notification icon to notify the user if there is an unread message or missed alert in a particular conversation. It should be appreciated that one skilled in the art can select different methods for ordering the list of recent conversations 264.

With continued reference to FIG. 16, the dialer icon 266 can be configured to be selectively pressed by the user to navigate to the dialer interface 224. The dialer icon 266 can be disposed adjacent to the bottom left corner 136 of the persistent display 122. Advantageously, permitting a user to selectively navigate to the dialer interface 224 from the phone interface 216 prioritizes the communication aspect of the communication device 100, instead of prioritizing "entertainment features" like modern smartphones. This can permit the user to focus on their current goal without getting distracted with entertainment features.

As further shown in FIG. 16, the search icon 268 can be configured to be selectively pressed by the user to navigate to the search interface 228. The search icon 268 can be disposed adjacent to the bottom border 140 of the persistent display 122, between the dialer icon 266 and the new text icon 270. Desirably, this can permit the user to access the search interface 228 quickly from the phone interface 216 without having to navigate through multiple intervening interfaces.

Referring still to FIG. 16, the new text icon 270 can be configured to be selectively pressed by the user to navigate to the new message interface 232. The new text icon 270 can be disposed adjacent to the bottom right corner 134 of the persistent display 122. Advantageously, this can permit the user to access the new message interface 232 quickly from the phone interface 216.

It is believed that placing the dialer icon 266, the search icon 268, and the new text icon 270 adjacent to the bottom border 140 of the persistent display 122, for example, as shown in FIG. 16, optimizes the space to give more room for the list of recent conversations 264 on the home interface 212. However, it should be appreciated that a skilled artisan can display more content on the home interface 212, within scope of this disclosure.

The phone interface can further include a phone scroll bar 275. The phone scroll bar 275 can be configured to show the user that the list of recent conversations 264 is too large to be displayed on the persistent display 122 at once. The user can scroll down to see the remaining portion of the list of recent conversations 264 by swiping up and down on the persistent display 122. The conversation scroll bar 275 can be displayed adjacent to the right border 142 of the persistent display 122.

With reference to FIG. 9, the dialer module 222 can be configured to render the dialer interface 224 on the persistent display 122. The dialer interface 224 can be configured to display a phone number entry field 271, an array of numerals and symbols 272, a manually-entered phone number 273, a new contact icon 274, a backspace icon 276, a dialer call icon 278, and the dialer text icon 280. The phone number entry field 271 can be configured to receive the manually-entered phone number 273 from the user. The phone number entry field 271 can be disposed adjacent to the top border 138 of the persistent display 122. The array of numerals and symbols 272 permits the user to input the manually-entered phone number by touching the numerals and symbols of the array of numerals and symbols 272. The array of numerals and symbols 272 can be disposed adjacent to the phone number entry field.

The new contact icon 274 of the dialer interface 224, shown in FIG. 9, can be configured to be selectively pressed by the user to navigate to the new contact interface 236, shown in FIG. 20, which can permit the user to create a contact based on the entered phone number. Desirably, this can permit the user to quickly create a new contact based on the entered phone number without having to navigate multiple interfaces. As shown in FIG. 9, the new contact icon 274 can be disposed adjacent to a periphery of the persistent display 122. In certain examples, the new contact icon 274 can be disposed adjacent to the top left corner 132 of the persistent display 122.

The backspace icon 276 of the dialer interface 224, also shown in FIG. 9, can be configured to permit the user to delete a numeral or symbol that has been inputted in via the array of numerals and symbols 272. Advantageously, this can permit the user to delete a numeral or symbol rendered on the persistent display 122 that was pressed by the user by mistake. The backspace icon 276 of the dialer interface 224 can be disposed adjacent to a periphery of the persistent display 122. In certain examples, the backspace icon 276 can be disposed adjacent to the top right corner 130 of the persistent display 122.

The dialer call icon 278 of the dialer module 222 can be configured to be selectively pressed by the user to navigate to the call interface 240, which can establish a phone call with the manually-entered phone number 273. Desirably, this can permit the user to quickly call the entered phone number without having to navigate multiple interfaces or adding the entered phone number as a contact. The dialer call icon 278 can be disposed adjacent to a periphery of the persistent display 122. In certain examples, the dialer call icon 278 can be displayed adjacent to the bottom left corner 136 of the persistent display 122.

The dialer text icon 280 can be configured to be selectively pressed by the user to navigate to the conversation interface 220, shown in FIG. 11, to allow the user to compose a text for the entered phone number. Advantageously, this can permit the user to text the entered phone number without having to navigate multiple interfaces or adding the entered phone number as a contact. The dialer text icon 280 can be disposed adjacent to a periphery of the persistent display 122. In certain examples, the dialer text icon 280 can be displayed adjacent to the bottom right corner 134 of the persistent display 122.

The dialer interface 224 can also include a dialer back icon 282. The dialer back icon can be configured to be selectively pressed by the user to navigate to the phone interface 216. The dialer back icon 282 can be disposed adjacent to a periphery of the persistent display 122. In certain examples, the dialer back icon 282 can be displayed between the dialer text icon 280 and the dialer call icon 278.

In addition, the new contact icon 274, the backspace icon 276, the dialer call icon 278, and the dialer text icon 280 can be configured to only be displayed once a phone number has been inputted by the user. Desirably, this can militate against the user being distracted by choices before inputting the phone number. However, it should be appreciated that other configurations of the new contact icon 274, the backspace icon 276, the dialer call icon 278, and the dialer text icon 280 are contemplated, within the scope of this disclosure.

With reference to FIG. 11, the conversation module 218 can be configured to render the conversation interface 220 on the persistent display 122. The conversation interface 220 can be configured to display communication received by the transceiver 128 from at least one of the different device 103 and an external device 105. The communication can include at least one of text messages, events, call history, and voicemail. The text messages can be received by the transceiver 128 from the different user of the different device 103. The text messages can be received by the transceiver 128 from the different user of the different device 103. The events can include events saved to the memory 126 by the user. The events can include at least one of birthdays and calendar events. The call history can include a history of calls made and received via the transceiver 128. The voicemail can include voicemails from the different user of the different device 103 saved to the memory 126. In certain examples, the communication can include alternative communication from a third-party application. The alternative communication can include at least one of text messages and phone calls. The third-party application can be executed on at least one of the different device 103 and the external device 105. A non-limiting example of the third-party application can include WHATSAPP™. In certain examples, the conversation interface 220 can include communication from a group chat. Desirably, this allows a user to see all the communication from the different user or group chat without having to sift through multiple interfaces and applications. It should be appreciated that a skilled artisan can select different information and communication for the communication being displayed on conversation interface 220.

The conversation interface 220 can be further configured to display a conversation call icon 283, a conversation back icon 284, and a conversation text icon 286, and a conversation scroll bar 288. The conversation call icon 283 can be configured to be selectively pressed by the user to navigate to the call interface 240, which can establish a phone call with at least one of the different device 103 and the group chat. The conversation call icon 283 can be displayed adjacent to the bottom left corner 136 of the persistent display 122.

The conversation back button can be configured to be selectively pressed by the user to navigate to the phone interface 216. The conversation back icon 284 can be displayed adjacent to the bottom border 140 of the persistent display 122, and between the conversation call icon 283 and the conversation text icon 286.

The conversation text icon 286 can be configured to be selectively pressed by the user to navigate to a digital keyboard interface 287. Desirably, the digital keyboard interface 287 can be used to input a text message for the selected conversation. The conversation text icon 286 can be displayed adjacent to the bottom right corner 134 of persistent display 122.

The conversation scroll bar 288 can be configured to show the user that the conversation too large to be displayed on the persistent display 122 at once. The user can scroll down to see the remaining portion of the conversation by swiping up and down on the persistent display 122. The conversation scroll bar 288 can be displayed adjacent to the right border 142 of the persistent display 122.

The conversation interface 220 can display the name of the conversation adjacent to the top border 138 of the persistent display 122. The name of the conversation can be the different user, an unknown number (if the different user has not been entered in as a contact), and a custom title. The name of the conversation notifies the user who is a part of the conversation. The custom title permits the user to input the name of the conversation. This can be especially useful for group conversations. In addition, the name of the conversation can be selectively pressed by the user to navigate to the edit contact interface 244. This can permit the user to quickly edit the contact that is a part of the conversation.

Now referring to FIG. 20, the search module 226 can be configured to permit the user search for a particular contact from a contact list. The search module 226 can be configured to render the digital keyboard interface 287 on the persistent display. The digital keyboard interface 287 can be configured to receive a user inputted query. Once the user inputs query, the search module 226 can be configured to display the search interface 228 to show a search result. Desirably, this can permit the user to locate a particular contact.

While still referring to FIG. 20, the new message module 230 can be configured to render the new message interface 232 on the persistent display 122. The new message interface 232 can be configured to receive at least one of a contact name or a phone number. Once the user inputs the contact name or phone number, the new message module 230 can be configured to render the digital keyboard interface 287 on the persistent display 122 to permit the user to compose a text message. It should be appreciated that the new message interface 232 can receive multiple contact names and phone numbers to create group chats.

The new contact module 234 can be configured to render the new contact interface 236 on the persistent display 122, as shown in FIG. 20. The new contact interface 236 can be configured to render the digital keyboard to permit the user to input contact details. The contact details can include a first name and a last name. However, it should be appreciated that a skilled artisan can select other details to include in the contact details. Non-limiting examples can include secondary numbers and addresses.

With reference to FIGS. 14-15, the call module 238 can be configured to render the call interface 240 on the persistent display 122. The call interface 240 can include an incoming call interface 241 (shown in FIG. 15) and an ongoing call interface 243 (shown in FIG. 14). The call module 238 can be configured to render the incoming call interface 241 on the persistent display 122 when an incoming call is being received by the communication device 100. The incoming call interface 241 can be configured to permit the user to selectively accept the incoming call and proceed to the ongoing call interface 243 via interactable objects. The incoming call interface 241 can also be configured to allow the user to selectively decline the call via interactable objects and return to a preceding interface, which in turn is rendered by a preceding module. The ongoing call interface 243 can be configured to be displayed during an ongoing call. The ongoing call interface 243 can permit a user to selectively mute the microphone 193, enable a speaker mode, or navigate to a keypad via interactable objects.

With renewed reference to FIG. 20, the edit contact module 242 can be configured to render the edit contact interface 244 on the persistent display 122. The edit contact interface 244 can be configured to permit a user to selectively change the contact details for the selected contact, or to even delete the selected contact. Desirably, this allows the user to update the contact details, such as by entering in a new phone number for a contact. The edit contact interface 244 can also be configured to permit a user to clear the conversation history for the selected contact. Clearing the conversation history can include removing the contents of the conversation module 218 for the selected contact. The edit contact interface 244 can also be configured to permit the user to selectively block the contact. Blocking the contact can include prohibiting phone calls or text messages from the blocked user. The edit contact interface 244 can be further configured to permit a user to selectively navigate to the call module 238 or the conversation module 218 for the selected contact via an interactable object. In certain examples, the selected contact can include an unknown number or a group contact. The group contact can include multiple contacts. It should be appreciated that a skilled artisan can employ different features for the edit contact module 242, within the scope of this disclosure.

While still referring to FIG. 20, the toolbox module 246 can be configured to render the toolbox interface 248 on the persistent display 122. The toolbox interface 248 can be configured to be rendered by the toolbox module 246 and displayed on the persistent display 122 when the user presses the toolbox button 198, for example. Advantageously, the toolbox module 246 can be accessed from any other of the modules 202 by the user using the toolbox button 198. In addition, and desirably, this can reduce the number of interfaces a user has to navigate through by allowing the toolbox module 246 to be navigated to directly from any interface and module by using the toolbox button 198. The toolbox interface 248 can be configured to permit a user to selectively navigate to at least one of the phone interface 216, a tool module 250, and the setting module 254 via an interactable objects.

The tool module 250 can include applications that are designed to be tools, and not attention-grabbing applications. The tool module 250 can be configured to render the tool interface 252 on the persistent display 122. The tool interface 252 can be configured to empower the user and assist in accomplishing tasks, such as by rendering a calculator application. The tool module 250 do not include applications that have "feeds" that are designed to encourage endless scrolling. Non-limiting examples of the tool module 250 can include an alarm application, a voice memo application, a calendar application, a navigation application, a music application, and a rideshare application. It should be appreciated that a skilled artisan can employ different applications for the tool module 250 as long as the applications are not designed to be attention-grabbing.

The curated platform 200 can be configured to minimize distractions by not rendering on the persistent display 122 predetermined attention-grabbing applications that can distract the user. Desirably, this militates against the user from being distracted and keeps the focus of the user on their current task. The predetermined attention-grabbing applications can be applications that are designed to gamify and/or distort social interactions, such as social media platforms. In addition, the predetermined attention-grabbing applications can include applications that promote "endless scrolling" and encourage the user to keep using the application. In certain examples, the predetermined attention-grabbing applications can include at least one of electronic mail applications, internet browser applications, social media applications, advertisements, and news feeds.

Now referring to FIG. 20, the setting module 254 can be configured to generate the setting interface 256. The setting interface 256 can be configured to permit the user to modify a plurality of user preferences associated with the purpose-driven GUI 204. Non-limiting examples of the user preferences can include general preferences, time preferences, display preferences, keyboard preferences, notification settings, contact preferences, roaming preferences, voicemail preferences, tool application preferences, passcode preferences, user account preferences, Bluetooth and Wi-Fi preferences, whitelist preferences, and filter preferences. It should be appreciated that one skilled in the art can add additional adjustable preferences for the user preferences, as desired.

The whitelist preferences can be configured to permit the user to set a whitelist. The whitelist can be configured to designate or identify user-approved phone numbers or other contact information for receipt of communications from the user-approved phone numbers or the other contact information. The whitelist can also be employed by the purpose-driven GUI 204 to block any communication except from those user-approved phone numbers. Advantageously, this can prevent unwanted communication from non-authorized numbers, thereby reducing the possibilities of the user being unnecessarily distracted.

The filter preferences can be configured to receive a predetermined quiet time interval or "quiet hours" from the user. The filter preferences can be further configured to block calls and texts during the predetermined quiet time intervals when enabled. In certain examples, the user can enable contacts that will not be blocked during the predetermined quiet time interval. In addition, the user can set up an automatic reply to be automatically be sent to persons who attempt to contact the user during the predetermined quiet time interval.

With reference to FIG. 10, the digital keyboard interface 287 can be configured to be navigated to and displayed on the persistent display 122 when required for data entry. In certain examples, each of the plurality of modules 202 can be configured to render the digital keyboard interface 287 on the persistent display 122 during data entry. In particular, the digital keyboard interface 287 can be configured to be displayed in a landscape orientation relative to a shape of the persistent display 122. Desirably, this can permit the user to have a full QWERTY keyboard even on a smaller display. In particular, the persistent display 122 can include a display width 123 and a display height 125. The display height 125 can be longer than the display width 123. It is believed that the digital keyboard interface 287 being displayed in the landscape orientation, when the display height 125 is longer than the display width 123, can result in optimized screen space.

Now referencing FIG. 18, the curated software can also include a fuzzy logic unit 290 and a graphics driver 292. The fuzzy logic unit 290 can be configured to receive a portion of a phone number manually entered by the user with the purpose-driven GUI 204 and approximate a remaining portion of the phone number. The approximation can be based off variables. The variables can include at least one previously entered phone numbers, telephone numbers of missed calls, and telephone numbers of contacts stored in the memory 126. Advantageously, the fuzzy logic unit 290 can be used to approximate the remaining digits of a phone number after the user has only inputted a portion with the dialer interface 224. In addition, the fuzzy logic unit 290 can also be configured to receive a portion of a name and approximate a remaining portion of the name. Desirably, this can be used to improve search algorithms used in the search module 226. It should be appreciated that a skilled artisan can select additional or fewer variables for use in the approximation, within the scope of this disclosure.

With continued reference to FIG. 18, it should be appreciated that the graphics driver 292 of the present disclosure can be specially configured to optimize rendering on the persistent display 122. The refresh rate on the persistent display 122 can vary on a per component basis, i.e., one interface can refresh with a different frame rate than another interface. Conventionally, this meant that a hardware layer would have to detect when the interface was ready to be drawn on a conventional persistent display, in order to render the interface to the conventional persistent display. It has been found that this conventional approach can lead to inconsistent experiences for the user. For example, some interfaces can take significantly longer to display than others. An application layer was not involved in this process. Instead, the application layer used a reactive layout model to optimize central processing unit (CPU) cost in calculations and in communications with input and output (I/O) on cellular/packet-switched networks with long latencies.

The graphics driver 292 improves upon these conventional approaches, for example, by allowing the application layer (i.e., an active module of the plurality of modules 202) to control the redrawing process in a process similar to the reactive architecture. Desirably, this can optimize the rendering for the persistent display 122 for a smoother rendering experience for the user. In addition, this can allow for greater performance and power optimization.

In certain examples, each of the plurality of modules 202 can be configured to generate a refresh request upon the user interacting with one of the interactable objects rendered on the persistent display 122. The graphics driver 292 can be configured to receive a refresh request from one of the plurality of modules 202 that is rendering an active interface of the plurality of interfaces 205. The active interface can be configured to display content. The graphics driver 292 can be configured to receive the refresh request from one of the plurality of modules 202 that is rendering the active interface of the plurality of interfaces 205. The graphics driver 292 can also be configured to refresh the active interface upon receiving the refresh request.

The process of refreshing the active interface can include a step of removing at least one of a portion and an entirety of the plurality of content of the active interface. In certain examples, refreshing the active interface can include sending an electric charge to move and rearrange ink particles of a pixel. In other examples, refreshing the active interface can include turning every pixel from white to black and then black to white to normalize the contrast of the pixels. However, it should be appreciated that a skilled artisan can employ different methods of refreshing the active interface, within the scope of this disclosure.

Advantageously, the refreshing process as described herein can result in a faster refresh of the active interface, especially in situations where the active module can react faster than the graphic driver. For example, the current interface can need to be refreshed quickly to permit the user to scroll through a conversation. Conventionally, it was not possible to achieve comfortable scrolling and interface updates while using the persistent display 122 due to the persistent nature and low frame rate. The purpose-driven GUI 204 can achieve comfortable scrolling and screen updates by utilizing a unique combination of cache optimization with the graphics driver 292. The cache optimization combines reactive-rendering technology and application-controlled display rendering via the graphics driver 292. Using this cache optimization, as well as being aware of network latency and the given communication state, allows the purpose-driven GUI 204 to conserve power, optimize network throughput, and achieve seemingly smooth scrolling.

It should be understood that this can be especially needed when using persistent display technology where the cost of refreshing can be resource demanding and expensive. It is believed that permitting the active module to direct the refreshing by the graphics driver 292 can allow for the persistent display 122 to be refreshed twice as fast as the conventional method. It should be appreciated that the graphic driver can also be useful when applied to other display technologies that have low refresh rates.

With reference to FIG. 21, a method 300 of using the graphics driver 292 is shown. The method 300 having a step 302 of providing the purpose-driven GUI 204 having the plurality of interfaces 205. Next, in a step 304, the graphics driver 292 is provided. Then, the persistent display 122 receives an interaction from the user, in a step 306. Next, in a step 308, the graphics driver 292 determines if the active interface needs to be refreshed based on the interaction from the user. If the active interface needs to be refreshed, then the active module sends a refresh request to the graphics driver 292, in a step 310. Then, in a step 312, the graphics driver 292 receives the refresh request from the graphics driver 292. Next, the graphics driver 292 refreshes the active interface, in a step 314. If the active interface does not need to be refreshed, then the method loops back to the step 306.

In a further embodiment, the purpose-driven GUI 204 can be applied to a separate application. The separate application can be at least one of a mobile application, web application, and a desktop application. Desirably, this can permit the user to experience the purpose-driven GUI 204 on a different communication device.

Advantageously, the purpose-driven GUI 204 of the present disclosure can render the plurality of interfaces 205 on the persistent display 122 that can militate against distractions from modern smartphone designs. As discussed above, the purpose-driven GUI 204 can be configured to optimize screen space and reduce the number of interfaces the user must navigate to accomplish their task. In addition, the plurality of layers, the haptic feedback system 199, and the graphics driver 292, alone or in combination, can assist in providing sufficient feedback to an input from the user.

While certain representative embodiments and details have been shown for purposes of illustrating the invention, it will be apparent to those skilled in the art that various changes can be made without departing from the scope of the disclosure, which is further described in the following appended claims.

What is claimed is:

1. A communication device, comprising:
a main body having:
a persistent display configured to selectively hold static text and images indefinitely without electricity;
a processor;
a memory in communication with the processor and the persistent display, the memory having a tangible, non-transitory computer readable memory with processor-executable instructions stored thereon, the processor-executable instructions defining a curated platform having a plurality of modules that, upon being executed by the processor, render on the persistent display a purpose-driven graphical user interface (GUI) having a plurality of interfaces with interactable objects, wherein the persistent display has an active area and a passive area, the active area configured to have the purpose-driven GUI rendered thereon, and the passive area configured have rendered thereon a predetermined color that substantially matches a color of a painted area of the communication device, wherein the curated platform is configured to minimize distractions to the user by not rendering predetermined attention-grabbing applications on the persistent display, and wherein the predetermined attention-grabbing applications include at least one of electronic mail applications, internet browser applications, social media applications, advertisements, and news feeds; and
a transceiver in communication with the processor and the memory, the transceiver configured to permit interpersonal communication between a user of the communication device and a different user of a different device using the purpose-driven GUI.

2. The communication device of claim 1, wherein the plurality of modules includes a dialer module configured to render a dialer interface on the persistent display, the dialer interface configured to display a phone number entry field, an array of numerals and symbols, a manually-entered phone number, a new contact icon, a dialer call icon, and a dialer text icon,
wherein the phone number entry field is configured to receive the manually-entered phone number from the user,
wherein the array of numerals and symbols disposed adjacent the phone number entry field and configured to be selectively pressed by the user to input the phone number at the phone number field,
wherein the new contact icon is disposed adjacent a periphery of the persistent display and configured to be selectively pressed by the user to navigate to the new contact interface for creating a contact based on the phone number,
wherein the dialer call icon is disposed adjacent a periphery of the persistent display and configured to be selectively pressed by the user to navigate to a call interface for establishing a phone call with the phone number, and
wherein the dialer text icon is disposed adjacent a periphery of the persistent display and configured to be selectively pressed by the user to navigate to a new message interface for composing a text message to the phone number.

3. The communication device of claim 1, wherein the plurality of modules includes a phone module configured to render a phone interface configured to display a list of recent conversations, a dialer icon, a search icon, and a new text icon,
wherein the list of recent conversations is configured to be selectively pressed by the user to navigate to a conversation interface for reading a previous conversation,
wherein the dialer icon is configured to be selectively pressed by the user to navigate to a dialer interface for entering a phone number,
wherein the search icon is configured to be selectively pressed by the user to navigate to a search interface for searching a contact, and
wherein the new text icon is configured to be selectively pressed by the user to navigate to a new message interface for composing a new message.

4. The communication device of claim 1, wherein the plurality of modules includes a conversation module configured to render a conversation interface, the conversation interface configured to display a communication received by the transceiver from at least one of the different device and an external device, and wherein the communication includes at least one of text messages received by the transceiver from the different user of the different device, alternative communication from a third-party application being executed on at least one of the different device and the external device, events saved to the memory by the user, call history of calls made and received via the transceiver, and voicemail from the different user of the different device saved to the memory.

5. The communication device of claim 4, wherein the conversation interface is further configured to display a notification that an image was received from the different user of the different device and to not display the image on the persistent display.

6. The communication device of claim 1, wherein at least one of the plurality of modules is configured to render a digital keyboard interface on the persistent display, and wherein the digital keyboard interface when rendered is displayed with a landscape orientation relative to a shape of the persistent display.

7. The communication device of claim 1, the main body further comprising a haptic feedback system in communication with the persistent display, and wherein the haptic feedback system is configured to emit a vibratory feedback where the user contacts one of the interactable objects displayed on one of the plurality of interfaces.

8. The communication device of claim 1, the plurality of modules further including a fuzzy logic unit configured to receive a portion of a telephone number manually entered by the user with the purpose-driven GUI and to approximate a remaining portion of the telephone number based on variables, wherein the variables include at least one of previously entered telephone numbers, telephone numbers of missed calls, and telephone numbers of contacts stored in the memory.

9. A communication device, comprising:
a main body having:
- a persistent display configured to selectively hold static text and images indefinitely without electricity;
- a processor;
- a memory in communication with the processor and the persistent display, the memory having a tangible, non-transitory computer readable memory with processor-executable instructions stored thereon, the processor-executable instructions defining a curated platform having a plurality of modules that, upon being executed by the processor, render on the persistent display a purpose-driven graphical user interface (GUI) having a plurality of interfaces with interactable objects, wherein the persistent display has an active area and a passive area, the active area configured to have the purpose-driven GUI rendered thereon, and the passive area configured have rendered thereon a predetermined color that substantially matches a color of a painted area of the communication device,
  wherein each of the plurality of modules is configured to generate a refresh request upon a user interacting with one of the interactable objects rendered on the persistent display, and
  wherein the curated platform further has a graphics driver configured to
    i) receive the refresh request from one of the plurality of modules that is rendering an active interface of the plurality of interfaces, and the active interface displaying content, and
    ii) refresh the active interface upon receiving the refresh request, wherein refreshing of the active interface includes removing at least one of a portion and an entirety of the content displayed on the active interface, and
  wherein the curated platform is configured to minimize distractions to the user by not rendering predetermined attention-grabbing applications on the persistent display, and wherein the predetermined attention-grabbing applications include at least one of electronic mail applications, internet browser applications, social media applications, advertisements, and news feeds; and
- a transceiver in communication with the processor and the memory, the transceiver configured to permit interpersonal communication between a user of the communication device and a different user of a different device using the purpose-driven GUI.

10. A communication device, comprising:
a main body having:
- a persistent display configured to selectively hold static text and images indefinitely without electricity and having a haze level between 52 percent and 66 percent;
- a processor;
- a memory in communication with the processor and the persistent display, the memory having a tangible, non-transitory computer readable memory with processor-executable instructions stored thereon, the processor-executable instructions defining a curated platform having a plurality of modules that, upon being executed by the processor, render on the persistent display a purpose-driven graphical user interface (GUI) having a plurality of interfaces with interactable objects, wherein the persistent display has an active area and a passive area, the active area configured to have the purpose-driven GUI rendered thereon, and the passive area configured have rendered thereon a predetermined color that substantially matches a color of a painted area of the communication device, wherein the curated platform is configured to minimize distractions to the user by not rendering predetermined attention-grabbing applications on the persistent display, and wherein the predetermined attention-grabbing applications include at least one of electronic mail applications, internet browser applications, social media applications, advertisements, and news feeds; and
- a transceiver in communication with the processor and the memory, the transceiver configured to permit interpersonal communication between a user of the communication device and a different user of a different device using the purpose-driven GUI.

11. The communication device of claim 10, the persistent display further comprising a display base panel and a glass layer disposed adjacent the display base panel, the glass layer having an etched surface.

12. The communication device of claim 11, wherein the persistent display further includes
- a first optical clear adhesive (OCA) layer disposed on the display base panel and between the display base panel and the glass layer,
- a front light film layer disposed on the first OCA layer and between the first OCA layer and the glass layer,
- a second OCA layer disposed on the front light film layer and between the front light film layer and the glass layer,
- a capacitive film layer disposed on the second OCA layer and between the second OCA layer and the glass layer,
- a third OCA layer disposed on the capacitive film layer and between the capacitive film layer and the glass layer, and
- a blackout paint layer disposed on the third OCA layer and between the third OCA layer and the glass layer.

13. The communication device of claim 12, wherein the persistent display further includes
- a color paint layer disposed on the blackout paint layer and between the blackout paint layer and the glass layer,
- a nonconductive vacuum metallization (NCVM) layer disposed on the color paint layer and between the color paint layer and the glass layer,
- a film layer disposed on the NCVM layer and between the NCVM layer and the glass layer,
- a fourth OCA layer disposed on the film layer and between the film layer and the glass layer, and
- an anti-fingerprint coating layer disposed on the glass layer.

14. The communication device of claim 13, wherein the main body further includes a front side having the persistent display and a painted area surrounding the persistent display, the painted area not including the persistent display and defined by at least one of the color paint layer, the NCVM layer and the film layer.

15. The communication device of claim 11, wherein the glass layer includes painted edges configured to militate against light from reflecting off the painted edges.

16. The communication device of claim 10, wherein the persistent display is a low refresh rate display.

17. The communication device of claim 16, wherein the low refresh rate display has a refresh rate below thirty frames per second.

18. The communication device of claim 10, wherein the persistent display is an electronic paper display.

* * * * *